(12) United States Patent
Martin et al.

(10) Patent No.: US 7,760,138 B2
(45) Date of Patent: Jul. 20, 2010

(54) GNSS RECEIVER WITH ENHANCED ACCURACY USING TWO SIGNAL CARRIERS

(75) Inventors: Nicolas Martin, Bourg les Valence (FR); Hervé Guichon, Guilherand (FR); Marc Revol, Upi∈ (FR)

(73) Assignee: Thales (FR)

( * ) Notice: Subject to any disclaimer, the term of this patent is extended or adjusted under 35 U.S.C. 154(b) by 0 days.

(21) Appl. No.: 12/090,118

(22) PCT Filed: Oct. 5, 2006

(86) PCT No.: PCT/EP2006/067097

§ 371 (c)(1),
(2), (4) Date: Oct. 7, 2008

(87) PCT Pub. No.: WO2007/042461

PCT Pub. Date: Apr. 19, 2007

(65) Prior Publication Data

US 2009/0219201 A1    Sep. 3, 2009

(51) Int. Cl.
G01S 1/02  (2010.01)
G01S 5/14  (2010.01)
(52) U.S. Cl. ............... 342/357.12; 342/357.02; 342/357.03
(58) Field of Classification Search ........... 342/357.02, 342/357.03, 357.06, 357.12, 358; 701/213, 701/215

See application file for complete search history.

(56) References Cited

U.S. PATENT DOCUMENTS 5,535,278 A    7/1996    Cahn et al.

FOREIGN PATENT DOCUMENTS

WO    03/054572 A1    7/2003
WO    03/107031 A2    12/2003

*Primary Examiner*—Dao L Phan
(74) *Attorney, Agent, or Firm*—Lowe Hauptman Ham & Berner, LLP

(57) ABSTRACT

A satellite positioning receiver is disclosed having at least one receive channel. Each receive channel is intended to perform a combined processing of a first S1 and a second S2 radiofrequency signals separated in frequency. The signals are received by analogue paths of the receive channel then digitized to be processed in digital receive paths. Each receive channel has a first (160) and a second (162) correlation circuits, respectively receiving the first and the second received digitized signals. Carrier and code phase discriminators are common to both correlation circuits. A local code generator is provided for each code correlation path. The local codes are offset by a positive differential delay correction $+\Delta\tau_{cal}$ for one of the correlation circuits and a negative differential delay correction $-\Delta\tau_{cal}$ for the other. These corrections tend to compensate for the relative delay difference between the two signals in the analogue paths of the receive channel. A phase differential correction device $\Delta\phi_{cal}$ tends to compensate for the phase differential deviation between the two signals occurring in the analogue paths of the receive channel.

13 Claims, 6 Drawing Sheets $T_{chip}$ : spreading code pulse duration $T_{chip}$ : spreading code pulse duration $T_{chip}$ : spreading code pulse duration

GNSS RECEIVER WITH ENHANCED ACCURACY USING TWO SIGNAL CARRIERS

CROSS-REFERENCE TO RELATED APPLICATIONS

The present application is based on International Application No. PCT/EP2006/067097, filed on Oct. 5, 2006, which in turn corresponds to French Application No. 05 10513 filed on Oct. 14, 2005, and priority is hereby claimed under 35 USC §119 based on these applications. Each of these applications are hereby incorporated by reference in their entirety into the present application.

FIELD OF THE INVENTION

The invention relates to satellite navigation receivers using the signals transmitted by satellites each comprising two carriers with frequencies close together modulated synchronously by spreading codes.

BACKGROUND OF THE INVENTION

Satellite positioning systems use several satellites transmitting their positioning by radiofrequency signals to a receiver placed in the position to be located estimating the distances, called pseudo-distances, that separate it from the satellites based on the propagation time of the captured satellite signals. The receiver is located by a technique similar to triangulation and this location is all the more accurate when the positions of the satellites are known accurately to the receiver and the measurements of the pseudo-distances done by the receiver are accurate.

The positions of the satellites are determined based on a network of ground tracking stations independent of the positioning receivers. They are communicated to the positioning receivers by the satellites themselves via the data modulating the transmitted signals.

The pseudo-distances are deduced by the positioning receivers from the apparent delays exhibited by the received signals: these signals are time-stamped on transmission by the clocks of the satellites, which are synchronized on the system time, and on receipt by the clock of the receiver, possibly exhibiting a bias relative to the system time. The distances deduced from the duly measured propagation times are called pseudo-distances because they are corrupted by a common error that can be significant, due to the bias of the clock of the receiver. This bias is eliminated on resolution of the fix provided that the signals from at least four satellites are received.

While the accuracy with which the positions of the satellites of the positioning system are known is independent of the performance of a positioning receiver, such is not the case for the pseudo-distance measurements which depend on the accuracy of the signal propagation time measurements on the receiver.

The radiofrequency signals transmitted by the satellites travel over long distances and are transmitted with limited power, so they arrive with very low power at the receivers, drowned in a radiofrequency noise. To enhance their reception efforts have been made to make them as insensitive as possible to narrowband interferences, by augmenting their bandwidths using the spread bandwidth technique. The current and anticipated near-future satellite positioning systems use, for the radiofrequency signals transmitted by their satellites, the modulation bandwidth spreading technique using pseudo-random binary sequences, a technique called DSSS (Direct Sequence Spread Spectrum). This DSSS modulation consists, after having converted the data to be transmitted into the form of a series of bits at regular bit rate, in calculating the product of each information bit with a pseudo-random binary sequence known in advance with a significantly faster bit rate. The resulting spread bandwidth is proportional to the bit rate of the spreading pseudo-random bit stream. The term "spreading code" is used.

The data to be transmitted by the satellites, once formatted as a spread frequency bit stream by a spreading code according to the DSSS technique, is transposed into the transmit frequency band by modulation with a transmit carrier.

On reception, the data contained in a radiofrequency signal from a satellite of a positioning system is extracted by two successive demodulations: a first demodulation using a carrier generated locally by an oscillator driven by a frequency and phase tracking loop called PLL (Phase-Locked Loop)—or carrier phase loop—used to transpose the received signal into baseband and a second demodulation using spreading code generated locally by a code generator driven by a delay tracking loop called DLL (Delay-Locked Loop)—or code loop—used to unspread the bit stream present in the received signal. The spreading codes generated locally are identical to those transmitted by the satellite, apart from the delay due to the propagation in space.

When a code loop is locked on, the code generated locally is in phase with the code contained in the signal received from the satellite.

Thus, the delays affecting the received spreading codes can be accessed in the code loop control signals. The delays observed by these loops allow for unambiguous or almost unambiguous measurements of the propagation times of the signals because the numbers of entire pseudo-random sequences repeated elapsing during the travel of the signals are relatively small. The term "code measurements" is used.

For example, for the GPS (Global Positioning System) satellite positioning system, the shortest repeated pseudo-random binary sequence, the one used for spreading C/A (Coarse/Acquisition Code or Clear/Acquisition Code) type satellite signals, is made up of 1023 bits with a bit rate of 1.023 MHz and a duration of one millisecond. Its overall duration corresponds to a travel distance of 300 km for a radiofrequency wave and therefore allows for modulo 300 km distance measurements. The 1 microsecond duration of each of its bits provides for an accuracy of around 0.1 microseconds. The ambiguity of the pseudo-distance measurements obtained from the pseudo-random binary sequence of a C/A code due to the fact that modulo 300 km measurements are being taken is easy to eliminate when the receiver receives from more than four satellites because it can then run a coherency check and retain only the coherent solution. In the absence of such a possibility, the ambiguity can also be eliminated using a very rough prior knowledge of the position. Such a measurement ambiguity does not arise with the type P satellite signals of the GPS system which use for their spreading a non-repeated encrypted pseudo-random binary sequence, but these signals are not freely available to the users.

The apparent delays of the transmit carriers can be accessed, modulo the periods of these carriers, by the local phases produced by the PLL carrier phase loops driving the local carrier generators. The term "phase measurements" applies. These measurements are very accurate but highly ambiguous. In the case of the GPS system, the signals accessible to the public use a 1.575 GHz carrier allowing pseudo-distance measurements that are modulo 0.19 m and therefore highly ambiguous, since the distance to the satellite is around 20 000 km.

Some satellite navigation systems use pairs of carrier frequency signals that are close together so as to be able to use them coherently and thus improve the accuracy of the position measurements, due to a broader spectrum.

FIG. 1 represents the spectra of a pair of signals transmitted by a satellite. Each satellite transmits two signals a and b, each comprising a carrier modulated by a pseudo-random code which spreads the spectrum. The two signals, in this example E5a (signal a) and E5b (signal b) having carrier frequencies that are different but very close, are sent synchronously, the relations between the phases of the two carriers and of the two spreading codes in transmission being known at all times.

Hereinafter, the following notations and definitions will apply:

The central carrier frequency is, by definition, the frequency located in the middle of the two carrier frequencies (for example, E5a and E5b).

The sub-carrier frequency is, by definition, the distance between the carrier frequency of the signal a or b and the central carrier frequency (or Fb−Fp=Fp−Fa).

Notations:

$F_p$ Central carrier frequency $F_p=(F_a+F_b)/2$ $F_{sp}$ Sub-carrier frequency $F_{sp}=(F_b-F_a)/2$ $F_a$ Carrier E5a frequency $F_a=F_p-F_{sp}$ $F_b$ Carrier E5b frequency $F_b=F_p+F_{sp}$ $F_c$ Code frequency $\omega_p=2\pi \cdot F_p$ Central carrier pulsing $\omega_p=(\omega_a+\omega_b)/2$ $\omega_{sp}=2\pi \cdot F_{sp}$ Sub-carrier pulsing $\omega_{sp}=(\omega_b-\omega_a)/2$ $\omega_a=2\pi \cdot F_a$ Carrier E5a pulsing $\omega_a=\omega_p-\omega_{sp}$ $\omega_b=2\pi \cdot F_b$ Carrier E5b pulsing $\omega_b=\omega_p+\omega_{sp}$ $\lambda_p=2\pi/F_p$ Central carrier wavelength $\lambda_{sp}=2\pi/F_{sp}$ Sub-carrier wavelength $\lambda_a=2\pi/F_a$ Carrier E5a wavelength $\lambda_b=2\pi/F_b$ Carrier E5b wavelength $\lambda_{code}=1/Fc$ Code wavelength In the rest of the document, the expression expi(θ) will be used for $e^{j\theta}$ where $j^2=-1$ In the case of bi-frequency services, the two signals in the receiver can be tracked independently on each band by PLL and DLL tracking loops. The pseudo-distance measurements, which rely on the delays observed by the code loops, are limited in accuracy by the width of each available band. Because of the independence of the tracking loops, any combined use of the measurements obtained from different bandwidth signals will give an accuracy limited by the less good of the two trackings.

It is, however, possible to improve the accuracy of the pseudo-distance measurements within the context of a bi-frequency service, with synchronous navigation signals, by combining the signals received on the two frequencies to benefit from a greater equivalent frequency bandwidth.

FIG. 2 shows the input analogue stages of a satellite positioning receiver using a pair of carriers E5a, E5b, as represented in FIG. 1. The analogue paths Va, Vb between the antenna and the intermediate frequency (IF) analogue/digital converters ADC 12, 14 have separate elements between the two received signals S1 and S2, which results in propagation and phase delay differentials.

FIG. 3 shows one of the two identical digital stages of a satellite positioning receiver of the state of the art driven by one of the two intermediate frequency (IF) digitized components E5a or E5b at the output of the analogue stage of FIG. 2. Each digital stage comprising a carrier correlation circuit 20 followed by a code correlation circuit 22.

For each satellite signal (E5a or E5b), a processing according to the state of the art is carried out with a carrier phase loop and a code loop. For this, a local carrier PI and local codes Ca, Cp, Cr are generated to demodulate the signal by correlation. The term "tracking channel" is used.

The phase of the local carrier PI and the position of the local codes in phase with the received signal are controlled using the tracking loops of each channel. Each tracking loop comprises, for the carrier loop, a carrier discriminator DSP, a carrier corrector CRP controlling a carrier oscillator NCOp 24 generating a carrier local phase driving a carrier generator 26 supplying the local carrier for the carrier correlation circuit and, for the code loop, a code discriminator DSC, a code corrector CRC controlling a code oscillator NCOc 28 generating a phase local code driving the code generator 30 generating the local codes Ca, Cp, Cr (advance, spot and delay) for the code correlation circuit.

The code and carrier phase discriminators make it possible to measure at the output of the correlators after integration by the integrators INT, the carrier phase and code differences between the received signal and the local signal, for retrospective action in the tracking loops.

The carrier phase loop helps the code loop driving the code local oscillator NCOc in order to reduce the loop trailing due to the dynamic range, which makes it possible to reduce the code loop band and therefore the noise on the measured code phase.

This processing is carried out in parallel for each signal from a satellite (or one channel for each satellite signal). The different, decorrelated codes from one satellite to another make it possible to dissociate the signals between the satellites and therefore allocate a channel to a satellite.

The measurements are the phases of the local carrier $\phi_{pb}$ (rad) and of the local code $\phi_{cb}$ (s) for each channel.

The role of the numerically controlled oscillators NCOp or NCOc is to produce the phases of the local high speed signals (>10 MHz) from the phase velocity controls generated by the low speed signal processing software (<1 kHz)

The role of the integrators INT is to produce the demodulated, unspread, aggregated signal samples $Z_A$, $Z_P$, $Z_R$ (advance, spot and delay) at low speed (<1 kHz) for the signal processing software from products output from the code demodulators generated at high speed (>10 MHz).

The "code demodulator" is the multiplier between the complex, carrier-mode demodulated received signal, and a local code. The complex resultant product is the unspread demodulated received signal.

The term "complex correlator" is used to mean the assembly comprising a code demodulator and an integrator (INT) with periodic reset (Integrate & Dump). In this case, we have three complex correlators producing $Z_A$, $Z_P$, $A_R$.

The processing of the two signals S1 and S2 (for example E5a and E5b) in the input stages of the receiver in separate analogue paths introduces different propagation times and phase delays on the two carriers (subsequently called delay differentials and phase differentials) which causes the coherence between the two components to be lost and causes the accuracy of the receiver measurements to be reduced (the signals can no longer be added together constructively), and biases the measurements.

SUMMARY OF THE INVENTION

The idea is to compensate the faults introduced on the signals received by the analogue paths at digital signal processing level, by a calibration performed using the signals received from the satellites themselves, by averaging and filtering the measurements to reduce the calibration errors To this end, the invention proposes a satellite positioning receiver comprising at least one receive channel (R1, R2, ... Ri, ... RN), each receive channel being intended to perform a combined processing of a first S1 and a second S2 radiofrequency signals transmitted by one and the same satellite and separated in frequency, the signals being received by analogue paths of the receiver then digitized to be processed in digital receive channels, characterized in that each receive channel comprises:

a first and a second correlation circuits, respectively receiving the first and the second digitized received signals, each correlation circuit having a carrier correlation path between the respective received signal and a respective complex local carrier (Lp1, Lp2), code correlation paths between the correlated received signal output from the carrier correlation paths and respective local codes, an integrator for each code correlation path, the receiver further comprising:

carrier and code phase discriminators, the discriminators being common to both correlation circuits and supplying, from signals output from the integrators of the two correlation circuits, on the one hand, after a code loop corrector, a subcarrier and code velocity signal (Vc) and, on the other hand, after a carrier loop corrector, a central carrier velocity signal (Vp);

a local code generator for each code correlation path, each code generator being driven by a local code phase signal output from at least one code numerically controlled oscillator NCOc controlled by the subcarrier velocity (or code velocity) signal, the local codes supplied by each code generator being offset by a positive differential delay correction $+\Delta\tau_{cal}$ for one of the correlation circuits and a negative differential delay correction $-\Delta\tau_{cal}$ for the other, these corrections tending to compensate the delay differential between the two signals received in the analogue paths of the receive channel;

a complex local carrier generator for each carrier correlation path, each local carrier generator being driven by a carrier local phase signal output from at least one carrier numerically controlled oscillator NCOp controlled by a central carrier velocity signal.

In the invention, a single carrier loop and a single code loop are constructed to process the two received signals S1, S2.

In an improvement of the receiver according to the invention, the receiver comprises, in addition, a phase differential correction device $\Delta\phi_{cal}$ tending to compensate the phase differential between the two received signals occurring in the analogue paths of the receive channel.

In a first theoretical embodiment of the receiver according to the invention, each receive channel further comprises:

a subcarrier correlation path for each received signal with complex local subcarriers generated by a respective subcarrier generator driven by a subcarrier local phase signal output from a code numerically controlled oscillator NCOc, each subcarrier correlation path receiving the correlated signals of its respective carrier correlation path and supplying subcarrier correlation signals to its respective code correlation path, the subcarrier local phase signal being offset by the differential phase $\Delta\phi_{cal}$ tending to compensate the phase differential between the two received signals being generated in the analogue paths of the receive channel.

The carrier loop controls the phase of the local central carrier, reflecting the average of the phases of the two local carriers, with the phase of the central carrier of the received signals, reflecting the average of the carrier phases of the two received signals.

The code loop (or subcarrier loop) simultaneously controls the phase of the local subcarrier, reflecting the phase difference between the carriers of the two local carriers, with the phase of the received subcarrier, reflecting the phase difference between the two received signals, and the position of the local codes with that of the received codes. In practice, the received subcarrier remains in phase with the received code at the foot of the antenna, because they are subject to the same group delay. The discriminator of the code and subcarrier loop has to use the output of the integrators of the advance, spot and delay correlation paths.

The offset induced by the separate analogue paths of the receive channel must be corrected and, to this end, the receiver according to the invention further comprises a calibration device supplying, based on phase and delay differential values (differentials due to the separate analogue paths between the two signals) estimated by the different channels of the receiver, the phase differential $\Delta\phi_{cal}$ and delay differential $\Delta\tau_{cal}$ correction values to be applied to the output of the carrier (or subcarrier) and code numerically controlled oscillators NCO common to all the channels.

In another practical embodiment of the receiver according to the invention comprising N receive channels (R1, R2, ... RN), each receive channel includes a code NCOc for each component of the signal S1 and S2 and the respective differential delay corrections, positive $+\Delta\tau_{cal}$ and negative $-\Delta\tau_{cal}$, are performed by applying to the inputs of the respective code NCOcs correction signals $+d\Delta\tau_{cal}/dt$ and $-d\Delta\tau_{cal}/dt$ derived from the differential delay signal $+\Delta\tau_{cal}$ and $-\Delta\tau_{cal}$ relative to the time t, and there is added to the output of the code numerically controlled oscillators NCOc a respective correction $+\Delta\tau_{0i}$ and $-\Delta\tau_{0i}$ specific to each channel i which depends on the initial state of the code oscillators NCOc at the moment when the receive channel begins tracking the signal in coherent mode.

The receiver can further comprise a phase differential correction device $\Delta\phi_{cal}$ receiving on the one hand a differential phase correction signal $\Delta\phi_{cal}$, on the other hand the signals output from the integrators of the two code correlation circuits and supplying to the discriminators signals including the phase differential compensation $\Delta\phi_{cal}$.

This embodiment of the receiver according to the invention makes it possible to retain the hardware architecture used in the case of an independent tracking of the signals S1 and S2 (according to the prior art), and it is easy to initialize tracking by beginning with a convergence phase according to this mode.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein:

FIG. 4 represents a block diagram of a receive channel of the receiver according to the invention performing a combined processing of a first S1 and a second S2 received radiofrequency signals.

DETAILED DESCRIPTION OF A PREFERRED EMBODIMENTS

Figure 4:
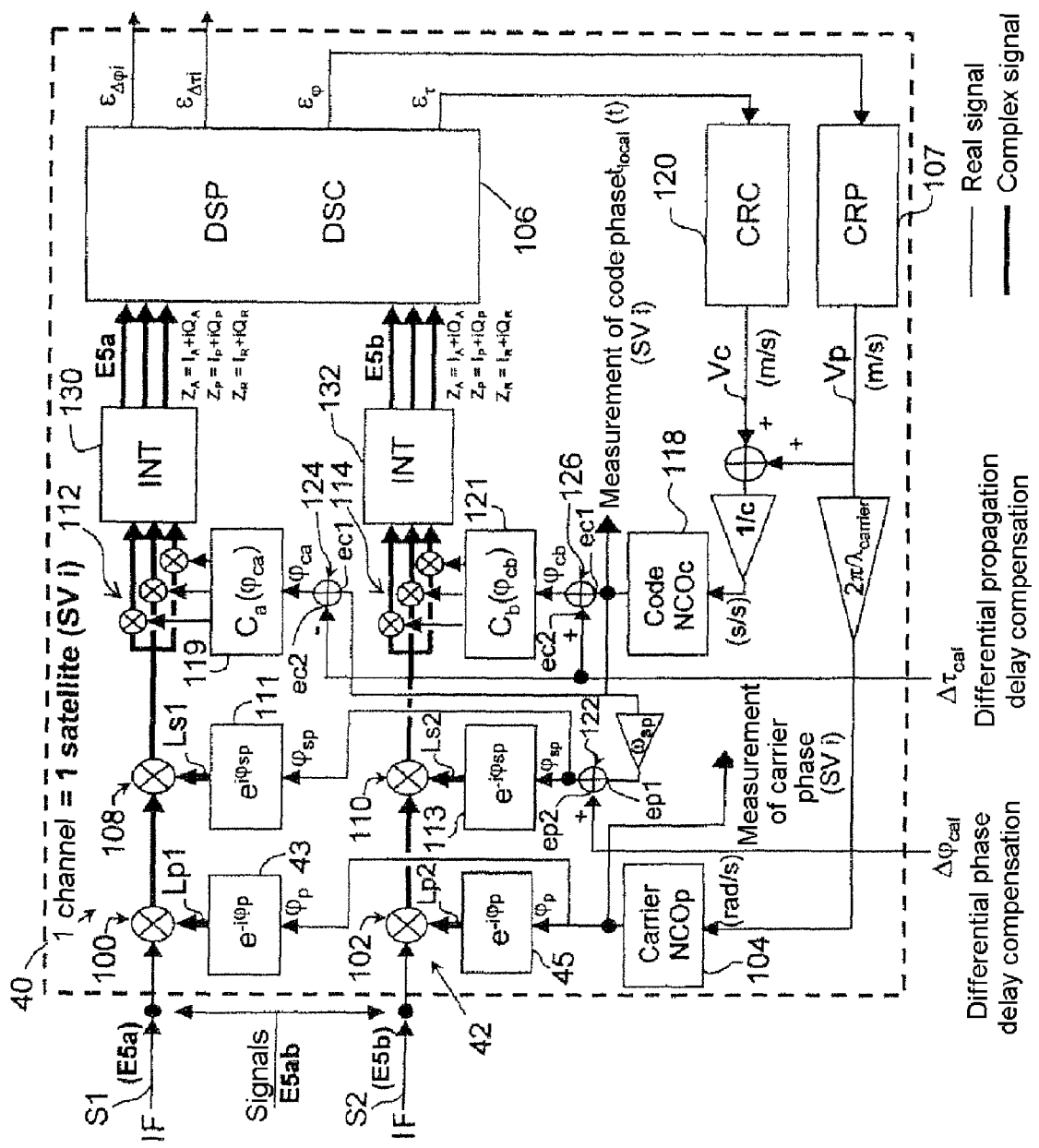
FIG. 4 shows a block diagram of a receiver according to the invention performing a combined processing of a first and a second received radiofrequency signals.

The receive channel of FIG. 4 comprises the first correlation circuit 40 driven by a first received signal S1 and the second correlation circuit 42 driven by the second received signal S2, each correlation circuit comprising a central carrier correlation path 100, 102 between its respective received signal S1, S2 and two respective complex local carriers Lp1 for the first correlation path 100 and Lp2 for the second path 102.

The complex local carriers are generated by a respective local carrier generator 43, 45 driven by a local phase signal $f_p$ output from a common central carrier numerically controlled oscillator NCOp 104 controlled by the carrier velocity signal Vp output from a central carrier phase discriminator circuit DSP (106) through a central carrier phase corrector CRP (107).

The signals output from the central carrier correlation paths are applied to subcarrier correlation paths 108, 110 with respective local subcarriers Ls1 for the first subcarrier correlation path and Ls2 for the other correlation path, then to the code correlation paths 112, 114.

The local subcarriers Ls1 and Ls2 are generated by a respective local subcarrier generator 111, 113 driven by a local subcarrier phase signal $f_{sp}$ output from a common subcarrier and code local numerically controlled oscillator NCOc 118.

The code oscillator NCOc 118 is controlled by a code velocity signal Vc output from a code phase discriminator DSC of the discriminator circuit 106 through a code phase corrector CRC 120.

A subcarrier phase summer 122 receives at an input ep1 the subcarrier phase output from the code oscillator NCOc 118 and at another input ep2 a phase differential correction $\Delta\phi_{cal}$ tending to compensate the phase differential between the two received signals occurring in the analogue paths of the receiver, the subcarrier phase summer 122 supplying, at its output, a local phase signal of the phase-shifted subcarriers to drive the subcarrier generator of the subcarrier correlation paths.

The signals output from the subcarrier correlation paths 108, 110 are then correlated in the respective code correlation paths 112, 114 with the respective local codes supplied by the respective local code generators 119, 121 for the signal S1 path and the signal S2 path.

The local code generators 119, 121 are driven by a respective code phase signal $f_{CA}$, $f_{CB}$ output from the common code oscillator NCOc 118, controlled by the subcarrier (or code) velocity signal Vc, through a first local code summer 124 receiving at an input ec1 the phase of the local code output from the local code oscillator and at another input ec2 a differential delay correction $-\Delta\tau_{cal}$ tending to compensate the differential delay, the first summer 124 supplying at its output an offset local code phase to drive the local code generator 119 of the signal S1 path and a second local code summer 126 receiving at an input ec1 the phase of the local code output from the local code oscillator NCOc and at another input ec2 a differential delay correction $+\Delta\tau_{cal}$ tending to compensate the differential delay, the second local code summer 126 supplying at its output an offset local code phase to drive the local code generator 118 of the signal S2 path.

Figure 3:
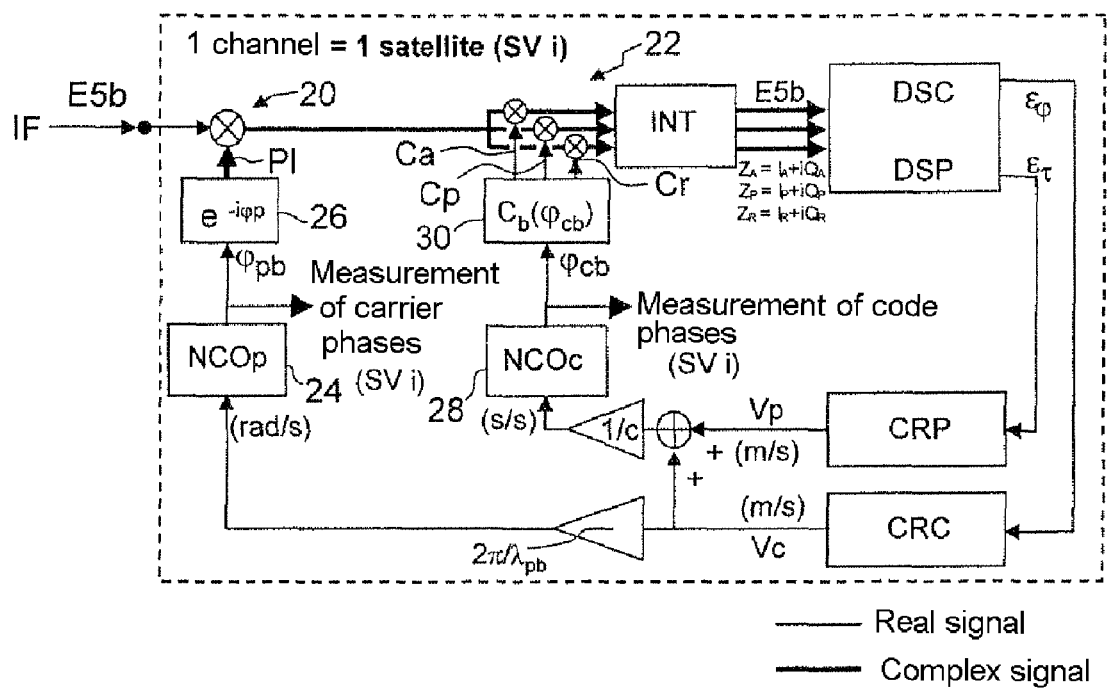
FIG. 3 shows one of the two identical digital stages of a satellite positioning receiver according to the prior art.

As in the receiver of FIG. 3, the signals output from the code correlation paths are then integrated by respective code integrators INT 130, 132 to supply signals driving the carrier DSP and code DSC discriminators 106 of the receiver.

The phase differential $\Delta\phi_{cal}$ and delay differential $\Delta\tau_{cal}$ correction is common to all the channels used for the reception of the signals transmitted by the satellites themselves.

Figure 5:
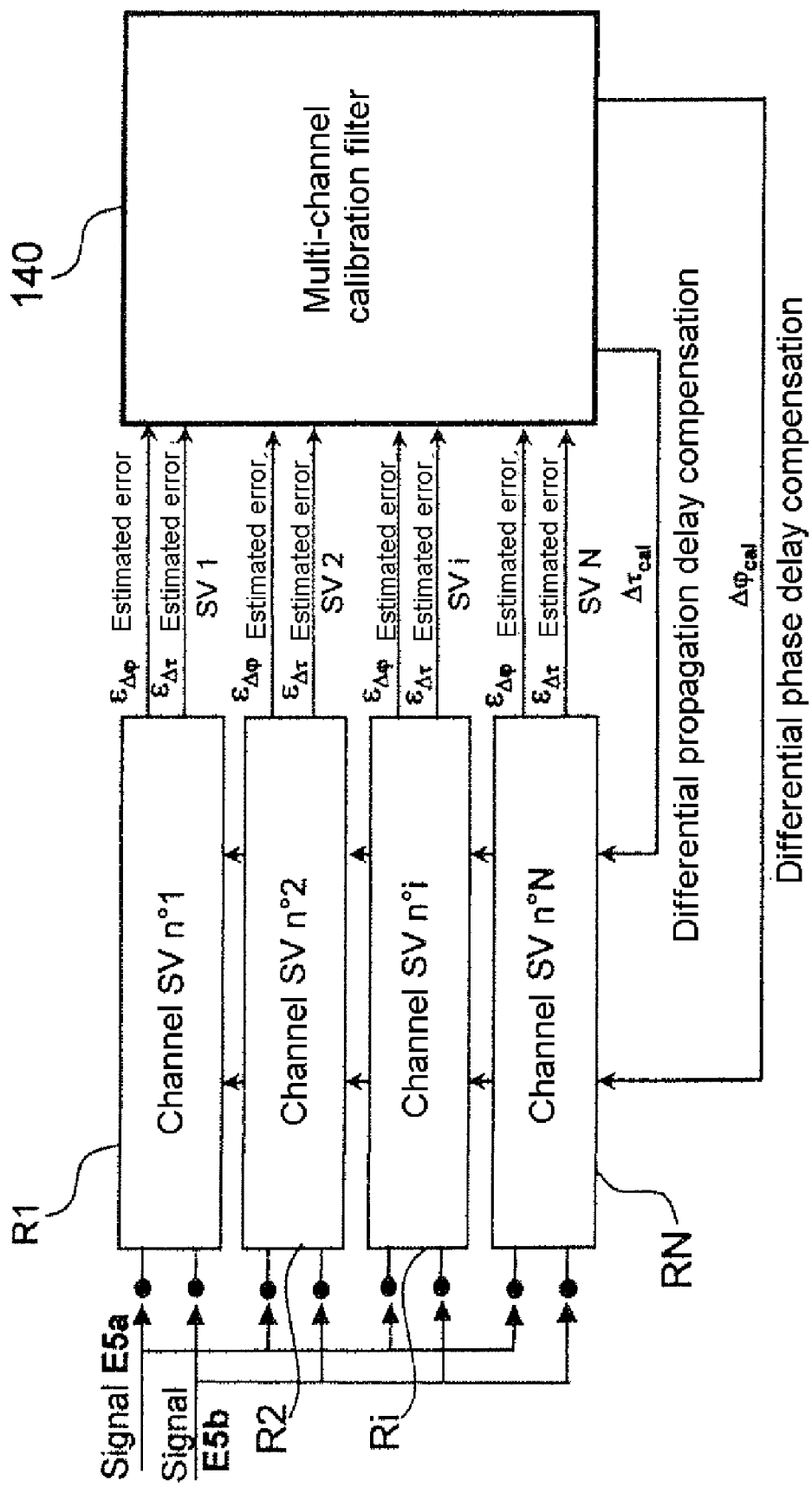
FIG. 5 shows a device for determining the phase and delay differentials of the receiver according to the invention.

FIG. 5 shows a device for determining propagation differential delay $\Delta\tau_{cal}$ and phase differential delay $\Delta\phi_{cal}$ of the satellite positioning receiver, according to the invention, from the received satellites.

The pairs of frequencies received from the satellites, for example the carriers E5a and E5b, are applied to N bi-frequency receive channels R1, R2, ... Ri ... RN of the same type as that described in FIG. 4.

Each bi-frequency receiver channel supplies a multichannel calibration filter 140 with the estimated values of the correction (or calibration) error of the phase differential $\epsilon_{\Delta\phi i}$ and of the correction (or calibration) error of the delay differential $\epsilon_{\Delta\tau i}$, which calculates the phase differential $\Delta\phi_{cal}$ and delay differential $\Delta\tau_{cal}$ corrections that will be applied to the summers of the subcarrier phase and local code output from the NCOs, for all the channels.

Each channel applies as output from the correlators discriminators that make it possible to separately identify the tracking loop control faults and calibration faults. These calibration faults estimated for each channel $\epsilon_{\Delta\phi i}$ and $\epsilon_{\Delta\tau i}$ (i being the number of the channel) affected by channel-specific errors, feed a multi-channel calibration filter 140, the function of which is to average between the channels and to filter these measurements in time to re-update the corrections $\Delta\phi_{cal}$ and $\Delta\tau_{cal}$, minimizing the impact of the measurement errors on the accuracy of the calibration.

There now follows a definition of the expression of the signals at the various stages of the receiver according to the invention and, to this end, the received signals are defined at the signal digitization level by the following expressions:

1—Received Signals:

1.a—Physical Form of the Received Signals:

$$S_{a\ received} = A \cdot \cos(\phi_{a\ received}(t) + \delta\phi_a) \cdot C_a(t_{received}(t) + \delta t_a) \cdot D_a(t_{received}(t))$$

$$S_{b\ received} = A \cdot \cos(\phi_{b\ received}(t) + \delta\phi_b) \cdot C_b(t_{received}(t) + \delta t_b) \cdot D_b(t_{received}(t))$$

1.b—Received Time:

$t_{received}(t)$: Time at which the signal received by the receiver at the instant t (at the foot of the antenna) was sent by the satellite $t_{propagation}(t)$: Propagation time between the satellite and the antenna of the receiver $$t_{received}(t) = t - t_{propagation}(t)$$

1.c—Received Carrier Phases:

$\phi_{a\ received}(t)$ Phase of the received signal at the instant t (at the foot of the antenna) on E5$a$ $\phi_{b\ received}(t)$ Phase of the received signal at the instant t (at the foot of the antenna) on E5$b$ $\delta\phi_a$: Phase delay on the E5$a$ path due to the receiver*

$\delta\phi_b$: Phase delay on the E5$b$ path due to the receiver*

$$\phi_{p\ received}(t) = \omega_p \cdot t_{received}(t) + \phi_{div}(t)$$

$$\phi_{a\ received}(t) = \omega_a \cdot t_{received}(t) + \phi_{div}(t)$$

$$\phi_{a\ received}(t) = \omega_p \cdot t_{received}(t) - \omega_{sp} \cdot t_{received}(t) + \phi_{div}(t)$$

$$\phi_{a\ received}(t) = \phi_{p\ received}(t) - \omega_{sp} \cdot t_{received}(t)$$

$$\phi_{b\ received}(t) = \omega_b \cdot t_{received}(t) + \phi_{div}(t)$$

$$\phi_{b\ received}(t) = \omega_p \cdot t_{received}(t) + \omega_{sp} \cdot t_{received}(t) + \phi_{div}(t)$$

$$\phi_{b\ received}(t) = \phi_{p\ received}(t) + \omega_{sp} \cdot t_{received}(t)$$

$\phi_{div}(t)$: divergence between the phase of the carrier and the group delay due to the ionosphere, which justifies the use of separate code and carrier loops.

1.d—Spreading Codes:

$C_a(t)$: Spreading code sent by the satellite at the instant t on E5$a$ $C_b(t)$: Spreading code sent by the satellite at the instant t on E5$b$ $C_a(t_{received}(t))$: Spreading code on E5$a$ received by the receiver at the instant t (at the foot of the antenna)

$C_b(t_{received}(t))$: Spreading code on E5$b$ received by the receiver at the instant t (at the foot of the antenna)

$\delta t_a$: Group delay on the E5$a$ path due to the receiver*

$\delta t_b$: Group delay on the E5$b$ path due to the receiver*

(*) Analogue processing between the foot of the antenna and the analogue/digital converter 1.e—Data:

$D_a(t_{received}(t))$: Data received at the instant t on the signal E5$a$ $D_b(t_{received}(t))$: Data received at the instant t on the signal E5$b$ In the case where the signal has a pilot path (that is, a path with no data), this path (distinguished from the data path by the decorrelated spreading code) is used.

1.f—New Expression of the Received Signals:

$$S_{a\ received} = A \cdot \cos(\phi_{p\ received}(t) - \omega_{sp} \cdot t_{received}(t) + \delta\phi_a) \cdot C_a(t_{received}(t) + \delta t_a) \cdot D(t_{received}(t))$$

$$S_{b\ received} = A \cdot \cos(\phi_{p\ received}(t) + \omega_{sp} \cdot t_{received}(t) + \delta\phi_b) \cdot C_b(t_{received}(t) + \delta t_b) \cdot D(t_{received}(t))$$

2—Local Signals:

Local signals are generated that are correlated with the received signal.

The correlation is done separately for the local carrier and the local code. However, this is mathematically equivalent to correlating the received signal with the product of the local carrier and of the local code (product called local signal).

2.a—Expression of the Physical Form of the Local Signals:

$$S_{a\ local\ advance} = A \cdot \text{exp}i(-\phi_p(t)) \cdot \text{exp}i(+\phi_{sp}(t)) \cdot C_a(\phi_{ca}(t) + d)$$

$$S_{a\ local\ spot} = A \cdot \text{exp}i(-\phi_p(t)) \cdot \text{exp}i(+\phi_{sp}(t)) \cdot C_a(\phi_{ca}(t))$$

$$S_{a\ local\ delay} = A \cdot \text{exp}i(-\phi_p(t)) \cdot \text{exp}i(+\phi_{sp}(t)) \cdot C_a(\phi_{ca}(t) - d)$$

$$S_{b\ local\ advance} = A \cdot \text{exp}i(-\phi_p(t)) \cdot \text{exp}i(-\phi_{sp}(t)) \cdot C_b(\phi_{cb}(t) + d)$$

$$S_{b\ local\ spot} = A \cdot \text{exp}i(-\phi_p(t)) \cdot \text{exp}i(-\phi_{sp}(t)) \cdot C_b(\phi_{cb}(t))$$

$$S_{b\ local\ delay} = A \cdot \text{exp}i(-\phi_p(t)) \cdot \text{exp}i(-\phi_{sp}(t)) \cdot C_b(\phi_{cb}(t) - d)$$

$\text{exp}i(-\phi_p(t))$: Central carrier, complex (combined)

$\text{exp}i(-\phi_{sp}(t))$: Local subcarrier, complex (combined)

$C_a(\phi_{ca}(t) + \epsilon \cdot d)$: Advance, spot, delay local codes ($\epsilon = -1, 0, 1$) path a, real $C_b(\phi_{cb}(t) + \epsilon \cdot d)$: Advance, spot, delay local codes ($\epsilon = -1, 0, 1$) path b, real Notation: $\text{exp}i(\theta) = e^{j\theta}$ in which $j^2 = -1$ $\phi_p(t)$: Local central carrier phase (rad)

$\phi_{sp}(t)$: Local subcarrier phase (rad)

$\phi_{ca}(t)$: Local code phase on path a (s)

$\phi_{cb}(t)$: Local code phase on path b (s)

1.b—Relation Between Estimated Received Time and Local Phase of the Codes:

$t_{estimated\ received}(t)$ Estimated received time output from the code NCO $$\phi_{sp}(t) = \omega_{sp} \cdot t_{estimated\ received}(t) + \Delta\phi_{cal}$$

$$\phi_{ca}(t) = t_{estimated\ received}(t) - \Delta\tau_{cal}$$

$$\phi_{cb}(t) = t_{estimated\ received}(t) + \Delta\tau_{cal}$$

1.c—Relation Between Received Time and Estimated Received Time:

$\phi$: Phase shift between the local phase and the received phase of the central carrier $\tau$: Delay on the estimated received time relative to the actual received time $$\phi_p(t) = \phi_{p\ received}(t) - \phi$$

$$t_{estimated\ received}(t) = t_{received}(t) - \tau$$

1.d—New Expression of the Local Signals:

$$S_{a\ spot\ local} = A \cdot \exp i(-\phi_{p\ received}(t) + \phi + \omega_{sp} \cdot t_{received}(t) - \omega_{sp} \cdot \tau + \Delta\phi_{cal}) \cdot C_a(t_{received}(t) - \tau - \Delta\tau_{cal})$$

$$S_{b\ spot\ local} = A \cdot \exp i(-\phi_{p\ received}(t) + \phi - \omega_{sp} \cdot t_{received}(t) + \omega_{sp} \cdot \tau - \Delta\phi_{cal}) \cdot C_b(t_{received}(t) - \tau + \Delta\tau_{cal})$$

3—Correlator Output: ("Integrate and Dump" Blocks)

$$Z_P = 1/T \int_{[nT,(n+1)T]} S_{received}(t) \cdot S_{spot\ local}(t) dt \text{ (Spot path)}$$

$$Z_A = 1/T \int_{[nT,(n+1)T]} S_{received}(t) \cdot S_{advance\ local}(t) dt \text{ (Advance path)}$$

$$Z_R = 1/T \int_{[nT,(n+1)T]} S_{received}(t) \cdot S_{delay\ local}(t) dt \text{ (Delay path)}$$

$$Z_{P\,a} = \tfrac{1}{2} \cdot \exp i(\phi - \omega_{sp} \cdot \tau + \Delta\phi_{cal} + \delta\phi_a) \cdot R(\tau + \Delta\tau_{cal} + \delta t_a)$$

$$Z_{P\,b} = \tfrac{1}{2} \cdot \exp i(\phi + \omega_{sp} \cdot \tau - \Delta\phi_{cal} + \delta\phi_b) \cdot R(\tau - \Delta\tau_{cal} + \delta t_b)$$

$$Z_{A\,a} = \tfrac{1}{2} A \cdot \exp i(\phi - \omega_{sp} \cdot \tau + \Delta\phi_{cal} + \delta\phi_a) \cdot R(\tau + \Delta\tau_{cal} + \delta t_a - d)$$

$$Z_{A\,b} = \tfrac{1}{2} A \cdot \exp i(\phi + \omega_{sp} \cdot \tau - \Delta\phi_{cal} + \delta\phi_b) \cdot R(\tau - \Delta\tau_{cal} + \delta_b - d)$$

$$Z_{R\,a} = \tfrac{1}{2} A \cdot \exp i(\phi - \omega_{sp} \cdot \tau + \Delta\phi_{cal} + \delta\phi_a) \cdot R(\tau + \Delta\tau_{cal} + \delta t_a + d)$$

$$Z_{R\,b} = \tfrac{1}{2} A \cdot \exp i(\phi + \omega_{sp} \cdot \tau - \Delta\phi_{cal} + \delta\phi_b) \cdot R(\tau - \Delta\tau_{cal} + \delta t_b + d)$$

(Notation: $(x+jy)^* = (x-jy)^*$ combined in the complex numbers sense)

R: self-correlation function of the spreading code:

$$R(\tau) = 1/T \int_{[nT,(n+1)T]} C_a(t) \cdot C_a(t-\tau) dt = 1/T \int_{[nT,(n+1)T]} C_b(t) \cdot C_b(t-\tau) dt$$

R is symmetrical: $R(\tau) = R(-\tau)$

4—Ideal Closed-Loop Control:

The ideal operating point, stabilized in permanent operation, for which the closed-loop control maximizes the output power of the spot correlation path, in phase, is chosen initially.

In permanent operation, the following are wanted:

$\phi - \omega_{sp} \cdot \tau - \Delta\phi_{cal} + \delta\phi_a = 0$ To rectify $Z_{P\,a}$ (zero imaginary part)

$\phi + \omega_{sp} \cdot \tau + \Delta\phi_{cal} + \delta\phi_b = 0$ To rectify $Z_{P\,b}$ (zero imaginary part)

$\tau - \Delta\tau_{cal} + \delta t_a = 0$ To maximize $R(\tau - \Delta\tau_{cal} + \delta t_a)$ $\tau + \Delta\tau_{cal} + \delta t_b = 0$ To maximize $R(\tau - \Delta\tau_{cal} + \delta t_b)$ ($R(\tau)$ is maximal for $\tau = 0$)

There are four equations and four unknowns: $\phi, \tau, \Delta\phi_{cal}$ and $\Delta\tau_{cal}$ Let $\tau_0, \phi_0, \Delta\phi_{cal\,0}$ and $\Delta\phi_{cal\,0}$ be the solutions to the problem:

$\tau_0 = (-\delta t_a - \delta t_b)/2$ $\Delta\tau_{cal\,0} = (\delta t_a - \delta t_b)/2$ $\phi_0 = (-\delta\phi_a - \delta\phi_b)/2$ $\Delta\phi_{cal\,0} = (\delta\phi_a - \delta\phi_b)/2 + \omega_{sp} \cdot (\delta t_a + \delta t_b)/2$ $$Z_{Pa} = \tfrac{1}{2} A \cdot \exp i\{(\phi-\phi_0) - \omega_{sp} \cdot (\tau-\tau_0) - (\Delta\phi_{cal} - \Delta\phi_{cal\,0})\} \cdot R\{(\tau-\tau_0) - (\Delta\tau_{cal} - \Delta\tau_{cal\,0})\}$$

$$Z_{Pb} = \tfrac{1}{2} A \cdot \exp i\{(\phi-\phi_0) + \omega_{sp} \cdot (\tau-\tau_0) + (\Delta\phi_{cal} - \Delta\phi_{cal\,0})\} \cdot R\{(\tau-\tau_0) + (\Delta\tau_{cal} - \Delta\tau_{cal\,0})\}$$

$$Z_{Aa} = \tfrac{1}{2} A \cdot \exp i\{(\phi-\phi_0) - \omega_{sp} \cdot (\tau-\tau_0) - (\Delta\phi_{cal} - \Delta\phi_{cal\,0})\} \cdot R\{(\tau+d-\tau_0) - (\Delta\tau_{cal} - \Delta\tau_{cal\,0})\}$$

$$Z_{Ab} = \tfrac{1}{2} A \cdot \exp i\{(\phi-\phi_0) + \omega_{sp} \cdot (\tau-\tau_0) + (\Delta\phi_{cal} - \Delta\phi_{cal\,0})\} \cdot R\{(\tau+d-\tau_0) + (\Delta\tau_{cal} - \Delta\tau_{cal\,0})\}$$

$$Z_{Ra} = \tfrac{1}{2} A \cdot \exp i\{(\phi-\phi_0) - \omega_{sp} \cdot (\tau-\tau_0) - (\Delta\phi_{cal} - \Delta\phi_{cal\,0})\} \cdot R\{(\tau-d-\tau_0) - (\Delta\tau_{cal} - \Delta\tau_{cal\,0})\}$$

$$Z_{Rb} = \tfrac{1}{2} A \cdot \exp i\{(\phi-\phi_0) + \omega_{sp} \cdot (\tau-\tau_0) + (\Delta\phi_{cal} \Delta\phi_{cal\,0})\} \cdot R\{(\tau-d-\tau_0) + (\Delta\tau_{cal} - \Delta\tau_{cal\,0})\}$$

5—Change of Variables:

$\phi - \phi_0$ becomes $\phi$ $\tau - \tau_0$ becomes $\tau$ $\Delta\phi_{cal} - \Delta\phi_{cal\,0}$ becomes $\Delta\phi$ $\Delta\tau_{cal} - \Delta\tau_{cal\,0}$ becomes $\Delta\tau$ $$Z_{P\,a} = \tfrac{1}{2} A \cdot \exp i\{\phi - \omega_{sp} \cdot \tau - \Delta\phi\} \cdot R\{\tau - \Delta\tau\}$$

$$Z_{P\,b} = \tfrac{1}{2} A \cdot \exp i\{\phi + \omega_{sp} \cdot \tau + \Delta\phi\} \cdot R\{\tau + \Delta\tau\}$$

$$Z_{A\,a} = \tfrac{1}{2} A \cdot \exp i\{\phi - \omega_{sp} \cdot \tau - \Delta\phi\} \cdot R\{\tau + d - \Delta\tau\}$$

$$Z_{A\,b} = \tfrac{1}{2} A \cdot \exp i\{\phi + \omega_{sp} \cdot \tau + \Delta\phi\} \cdot R\{\tau + d + \Delta\tau\}$$

$$Z_{R\,a} = \tfrac{1}{2} A \cdot \exp i\{\phi - \omega_{sp} \cdot \tau - \Delta\phi\} \cdot R\{\tau - d - \Delta\tau\}$$

$$Z_{R\,b} = \tfrac{1}{2} A \cdot \exp i\{\phi + \omega_{sp} \cdot \tau + \Delta\phi\} \cdot R\{\tau - d + \Delta\tau\}$$

6—Path a+b:

An effort is made to coherently add together the outputs of the correlators of paths a and b so as to have the maximum sensitivity to synchronization errors of the code and carrier phase tracking loops.

Let:

$$Z_P = Z_{P\,a} + Z_{P\,b}$$

$$Z_A = \exp i(-\phi_{sp} \cdot d) \cdot Z_{A\,a} + \exp i(+\omega_{sp} \cdot d) \cdot Z_{A\,b}$$

$$Z_R = \exp i(+\omega_{sp} \cdot d) \cdot Z_{R\,a} + \exp i(-\omega_{sp} \cdot d) \cdot Z_{R\,b}$$

NOTE: d is the spacing between the advance, spot and delay correlators.

If $\Delta\tau = 0$:

$$Z_P = A \cdot \exp i(\phi) \cdot \cos\{\omega_{sp} \cdot \tau + \Delta\phi\} \cdot R(\tau)$$

If $\Delta\tau = 0$ and $\Delta\phi p = 0$:

$$Z_P = A \cdot \exp i(\phi) \cdot \cos\{\omega_{sp} \cdot (\tau)\} \cdot R(\tau) = \tfrac{1}{2} A \cdot \exp i(\phi) \cdot R_{cos}(\tau)$$

$$Z_A = A \cdot \exp i(\phi) \cdot \cos\{\omega_{sp} \cdot (\tau+d)\} \cdot R(\tau+d) = \tfrac{1}{2} A \cdot \exp i(\phi) \cdot R_{cos}(\tau+d)$$

$$Z_R = A \cdot \exp i(\phi) \cdot \cos\{\omega_{sp} \cdot (\tau-d)\} \cdot R(\tau-d) = \tfrac{1}{2} A \cdot \exp i(\phi) \cdot R_{cos}(\tau-d)$$

With $R_{cos}(\tau) = \cos(\omega_{sp} \cdot \tau) \cdot R(\tau)$

Figure 6:
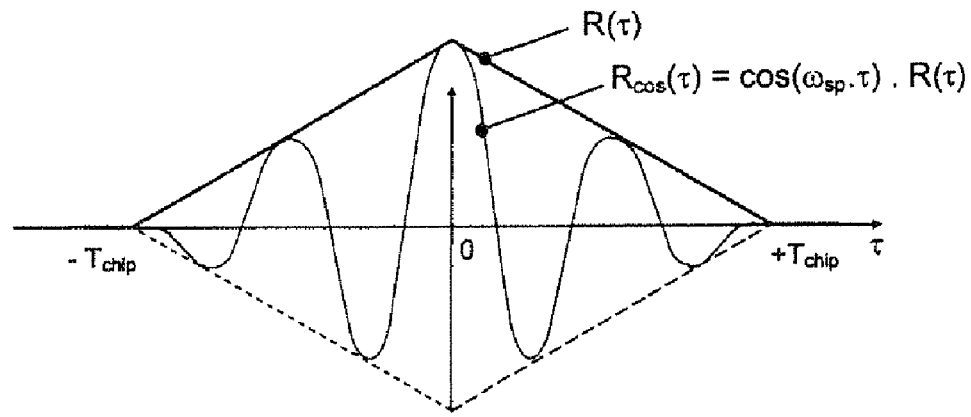
FIGS. 6, 7 and 8 show self-correlation functions of the receiver according to the invention.

FIG. 6 shows the self-correlation function $R_{cos}(\tau)$.

There is a peak in the self-correlation function that is far more pronounced on $R_{cos}$ than on R, which substantially improves the accuracy of the measurement.

Furthermore, the maximum amplitude is recovered on the path $Z_P$ which makes the closed-loop control of the carrier phase more accurate and more robust.

This justifies the objective of keeping $\Delta\tau$ and $\Delta\phi$ at zero, by the choice of dedicated discriminators detecting non-zero values on $\Delta\tau$ and $\Delta\phi$ and enabling a retroactive correction by a calibration filter.

7—Discriminators (for Each Satellite Received):

Central carrier phase: $\epsilon_\phi(\phi, \tau, \Delta\phi, \Delta\tau)$ Estimation of $\phi$ Code delay: $\epsilon_\tau(\phi, \tau, \Delta\phi, \Delta\tau)$ Estimation of $\tau$ Phase differential: $\epsilon_{\Delta\phi}(\phi, \tau, \Delta\phi, \Delta\tau)$ Estimation of $\Delta\phi$ Group differential: $\epsilon_{\Delta\tau}(\phi, \tau, \Delta\phi, \Delta\tau)$ Estimation of $\Delta\tau$ The aim of these discriminators is to estimate, each by a combination of the outputs of the six correlators, the quantities $\phi, \tau, \Delta\phi, \Delta\tau$ (after change of frame of reference) which indicate what is lacking respectively on $\phi, \tau, \Delta\phi_{cal}, \Delta\tau_{cal}$ (before change of frame of reference) to reach the ideal closed-loop control giving the maximum accuracy and robustness on the central carrier phase and received time measurements. This allows for convergence by retrospective action towards the ideal closed-loop control.

The objective is that:

$\epsilon_\phi(\phi, \tau, 0, 0) \cong \phi$ in the first order $\epsilon_\tau(\phi, \tau, 0, 0) \cong \tau$ in the first order And that:

$\epsilon_{\Delta\phi}(\phi, \tau, \Delta\phi, 0) \cong \Delta\phi$ in the first order $\epsilon_{\Delta\tau}(\phi, \tau, 0, \Delta\tau) \cong \Delta\tau$ in the first order 7.a—Phase Discriminator:

$$\epsilon_\phi = Arg(Z_P) = Arg(Z_{Pa} + Z_{Pb}) = \arctan(I_{Pa} + I_{Pb}, Q_{Pa} + Q_{Pb})$$

$$\epsilon_\phi(\phi, \tau, \Delta\phi, \Delta\tau) = Arg[\exp i(\phi) \cdot R_{a+b}(\tau, \Delta\phi, \Delta\tau)]$$

$$\epsilon_\phi(\phi, \tau, \Delta\phi, \Delta\tau) = \phi + Arg[R_{a+b}(\tau, \Delta\phi, \Delta\tau)]$$

with $$R_{a+b}(\tau, \Delta\phi, \Delta\tau) = \exp i(-\omega_{sp} \cdot \tau - \Delta\phi) \cdot R(\tau - \Delta\tau) + \exp i(\omega_{sp} \cdot \tau + \Delta\phi) \cdot R(\tau + \Delta\tau)$$

If $\Delta\tau = 0$, then at least:

$$\epsilon_\phi(\phi, \tau, \Delta\phi, 0) = \phi$$

because $R_{a+b}(\tau, \Delta\phi, 0) = \cos(\omega_{sp} \cdot \tau + \Delta\phi) \cdot R(\tau)$ is a real function However, if $\Delta\phi \neq 0 | R_{a+b}(\tau, \Delta\phi, 0) | < R_{cos}(\tau)$ then accuracy on c(P is lost, hence a reduced robustness and the need to keep $\Delta\phi$ zero.

If $\Delta\tau \neq 0$, then:

$$R_{a+b}(\tau, \Delta\phi, \Delta\tau) = \cos(-\omega_{sp} \cdot \tau - \Delta\phi)\{R(\tau - \Delta\tau) + R(\tau + \Delta\tau)\} + i \cdot \sin(-\omega_{sp} \cdot \tau - \Delta\phi)\{-R(\tau - \Delta\tau) + R(\tau + \Delta\tau)\}$$

$R_{a+b}(\tau, \Delta\phi, \Delta\tau)$ is no longer a real function

The measurement depends on $\tau$, therefore there is a coupling between the code and phase measurement.

$$R_{a+b}(0, \Delta\phi, \Delta\tau) = \cos(-\Delta\phi)\{R(-\Delta\tau) + R(+\Delta\tau)\} + i \cdot \sin(-\Delta\phi)\{-R(-\Delta\tau) + R(+\Delta\tau)\}$$

$R_{a+b}(0, \Delta\phi, \Delta\tau) = 2 \cos(-\Delta\phi) \cdot R(\Delta\tau)$ if R is symmetrical There is no bias for $\tau = 0$ 7.b—Code Discriminator: the Code Discriminator Uses the Output of the Advance, Spot and Delay Correlation Paths on S1 and S2 (after Calibration)

$$\epsilon_\tau = Re[(Z_A - Z_R) \cdot Z_P^*]/\mu \quad \text{(Re: real part, *: combined)}$$

$\mu$: standardization factor to have a unitary slope to the origin

If $\Delta\tau = 0$ and $\Delta\phi = 0$, then at least:

$$Z_A - Z_R = A \cdot \exp i(\phi) \cdot [R_{cos}(\tau + d) - R_{cos}(\tau - d)]$$

$$Z_P^* = A \cdot \exp i(-\phi) \cdot R_{cos}(\tau)$$

$$\epsilon_\tau(\phi, \tau, 0, 0) = A^2/\mu \cdot [R_{cos}(\tau + d) - R_{cos}(\tau - d)] \cdot R_{cos}(\tau)$$

$$\epsilon_\tau(\phi, 0, 0, 0) = 0$$

$$\partial \epsilon_\tau / \partial \tau(\phi, 0, 0, 0) = 2A^2/\mu \cdot R_{cos}'(d) \cdot R_{cos}(0)$$

$$\epsilon_\tau(\phi, \tau, 0, 0) \cong 2A^2/\mu \cdot R_{cos}'(d) \cdot R_{cos}(0) \cdot \tau$$

$$\epsilon_\tau(\phi, \tau, 0, 0) \cong \tau \text{ for } \mu = 2A^2 R_{cos}'(d) \cdot R_{cos}(0) \text{ and } \tau \ll 1$$

Figure 7:
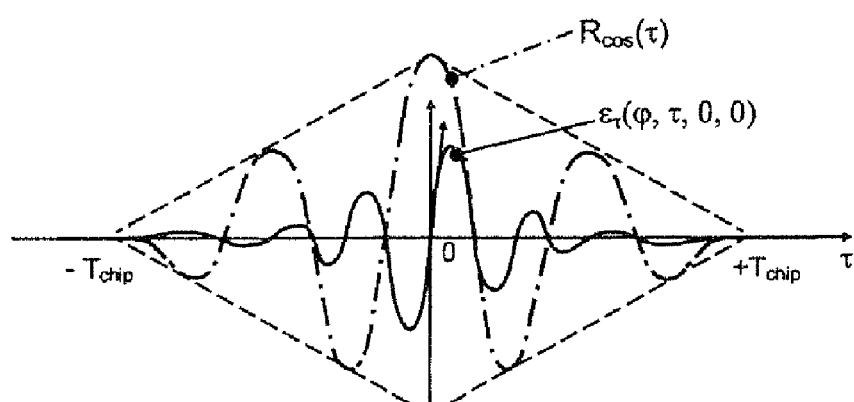

FIG. 7 shows the functions $R_{cos}(\tau)$ and $\epsilon_\tau(\phi, \tau, 0, 0)$, Tchip being the duration of a pulse of the spreading code.

If $\Delta\tau = 0$ and $\Delta\phi \neq 0$, then:

$$\epsilon_\tau(\phi, \tau, \Delta\phi, 0) = A^2/\mu \cdot [\cos\{\omega_{sp} \cdot (\tau + d) + \Delta\phi\} \cdot R(\tau + d) - \cos\{\omega_{sp} \cdot (\tau - d) + \Delta\phi\} \cdot R(\tau - d)] \cdot \cos(\phi_{sp} \cdot \tau + \Delta\phi) \cdot R(\tau)$$

Figure 8:
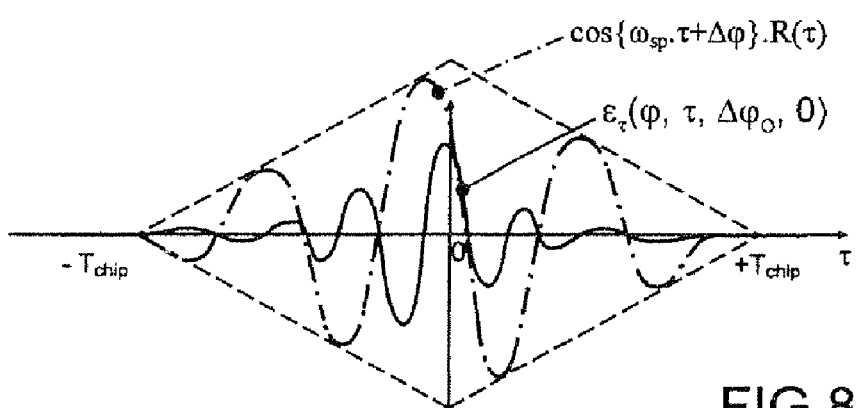

FIG. 8 shows the functions $\cos\{\omega_{sp} \cdot \tau + \Delta\phi\} \cdot R(\tau)$ and $\epsilon_\tau(\phi, \tau, 0, 0)$ $$\epsilon_\tau(\phi, 0, \Delta\phi, 0) = A^2/\mu \cdot [\cos(\omega_{sp} \cdot d + \Delta\phi) - \cos(-\omega_{sp} \cdot d + \Delta\phi)] \cdot R(d) \cdot \cos(\Delta\phi) \cdot R(0)$$

$$\epsilon_\tau(\phi, 0, \Delta\phi, 0) \cong A^2/\mu \cdot 2 \sin(\omega_{sp} \cdot d) \cdot \Delta\phi \cdot R(d) \cdot \cos(\Delta\phi) \cdot R(0)$$

$$\epsilon_\tau(\phi, 0, \Delta\phi, 0) \cong \rho \cdot \Delta\phi \text{ for } \rho = A^2/\mu \cdot 2 \sin(\omega_{sp} \cdot d + \Delta\phi) \cdot R(d) \cdot \cos(\Delta\phi) \cdot R(0)$$

A bias is seen to appear and, furthermore, accuracy is lost: hence the need to keep $\Delta\phi$ zero.

In fact, the bias will be reflected in the code loop by an error on the estimated received time, that is, a non-zero $\tau$.

If $\Delta\tau \neq 0$ and $\Delta\phi = 0$, then:

$$\epsilon_\tau(\phi, \tau, 0, \Delta\tau) = (\tfrac{1}{2}A)^2/\mu \cdot [\cos\{\omega_{sp} \cdot (\tau + d)\} \cdot \{R(\tau + d + \Delta\tau) + R(\tau + d - \Delta\tau)\} - \cos\{\omega_{sp} \cdot (\tau - d)\} \cdot \{R(\tau - d + \Delta\tau) + R(\tau - d\Delta\tau)\}] \cdot \cos\{\omega_{sp} \cdot \tau\} \cdot \{R(\tau + \Delta\tau) + R(\tau - \Delta\tau)\}$$

$$\epsilon_\tau(\phi, 0, 0, \Delta\tau) = (\tfrac{1}{2}A)^2/\mu \cdot \cos(\omega_{sp} \cdot d) \cdot \{R(d + \Delta\tau) + R(d - \Delta\tau) - R(-d + \Delta\tau) - R(-d - \Delta\tau)\} \cdot 2 \cdot R(\Delta\tau)$$

$\epsilon_\tau(\phi, 0, 0, \Delta\tau) = 0$ because R is symmetrical

There is no bias but power is lost.

7.c—Delay Differential Discriminator:

$$\epsilon_{\Delta\phi} = arg[Z_{Pb} \cdot Z_{Pa}^*]/2 - \omega_{sp} \cdot \epsilon_\tau$$

$$Z_{Pb} \cdot Z_{Pa}^* = (\tfrac{1}{2}A)^2 \cdot \exp i\{2\omega_{sp} \cdot \tau + 2\Delta\phi\} \cdot R\{\tau - \Delta\tau\} \cdot R\{\tau + \Delta\tau\} arg[Z_{Pb} \cdot Z_{Pa}^*]/2 = \omega_{sp} \cdot \tau + \Delta\phi$$

If $\Delta\tau = 0$, then:

$$\epsilon_\tau(\phi, \tau, \Delta\phi, 0) \cong \tau + \rho \cdot \Delta\phi$$

$$\epsilon_{\Delta\phi}(\phi, \tau, \Delta\phi, 0) = \omega_{sp} \cdot \tau + \Delta\phi - \omega_{sp} \cdot (\tau + \rho \cdot \Delta\phi) \cong (1 - \omega_{sp} \cdot \rho) \cdot \Delta\phi$$

for $\Delta\phi \ll 1$

Variant:

It is possible to take: $\epsilon_{\Delta\phi}=\arg[Z_{P\,b}\cdot Z_{P\,a}{}^*]/2-\omega_{sp}\cdot(\epsilon_{code\,b}+\epsilon_{code\,a})/\eta(\epsilon_{code\,b}+\epsilon_{code\,a})/\eta\cong\tau$ for $\tau\ll 1$ and $\Delta\tau\ll 1$ $\epsilon_{\Delta\phi}(\phi,\tau,\Delta\phi,0)=\omega_{sp}\cdot\tau+\Delta\phi-\omega_{sp}\cdot(\epsilon_{code\,b}+\epsilon_{code\,a})/\eta\cong\Delta\phi$

7.d—Delay Differential Discriminator:

$\epsilon_{\Delta\tau}=(\epsilon_{code\,b}-\epsilon_{code\,a})/\eta$ $\epsilon_{code\,a}=Re[(Z_{A\,a}-Z_{R\,a})\cdot Z_{P\,a}{}^*]$ $Z_{P\,a}=\frac{1}{2}A\cdot\exp i\{\phi-\omega_{sp}\cdot\tau-\Delta\phi\}\cdot R\{\tau-\Delta\tau\}$ $Z_{A\,a}=\frac{1}{2}A\cdot\exp i\{\phi-\omega_{sp}\cdot\tau-\Delta\phi\}\cdot R\{\tau+d-\Delta\tau\}$ $Z_{R\,a}=\frac{1}{2}A\cdot\exp i\{\phi-\omega_{sp}\cdot\tau-\Delta\phi\}\cdot R\{\tau-d-\Delta\tau\}$ $\epsilon_{code\,a}(\phi,\tau,\Delta\phi,\Delta\tau)=(\frac{1}{2}A)^2\cdot[R(\tau+d-\Delta\tau)-R(\tau-d-\Delta\tau)]\cdot R(\tau-\Delta\tau)$ $\epsilon_{code\,a}(\phi,\tau,\Delta\phi,\Delta\tau)\cong 2(\frac{1}{2}A)^2 R'(d)\cdot R(0)\cdot(\tau-\Delta\tau)$ $\epsilon_{code\,b}=Re[(Z_{A\,b}-Z_{R\,b})\cdot Z_{P\,b}{}^*]/\eta$ $Z_{P\,b}=\frac{1}{2}A\cdot\exp i\{\phi+\omega_{sp}\cdot\tau+\Delta\phi\}\cdot R\{\tau+\Delta\tau\}$ $Z_{A\,b}=\frac{1}{2}A\cdot\exp i\{\phi+\omega_{sp}\cdot\tau+\Delta\phi\}\cdot R\{\tau+d+\Delta\tau\}$ $Z_{R\,b}=\frac{1}{2}A\cdot\exp i\{\phi+\omega_{sp}\cdot\tau+\Delta\phi\}\cdot R\{\tau-d+\Delta\tau\}$ $\epsilon_{code\,b}(\phi,\tau,\Delta\phi,\Delta\tau)(\frac{1}{2}A)^2\cdot[R(\tau+d+\Delta\tau)-R(\tau-d+\Delta\tau)]\cdot R(\tau+\Delta\tau)\cong 2(\frac{1}{2}A)^2 R'(d)\cdot R(0)\cdot(\tau+\Delta\tau)$ $\epsilon_{\Delta\tau}(\phi,\tau,\Delta\phi,\Delta\tau)\cong 2(\frac{1}{2}A)^2/\eta\cdot R'(d)\cdot R(0)\cdot\Delta\tau\epsilon_{\Delta\tau}(\phi,\tau,\Delta\phi,\Delta\tau)\cong\Delta\tau$ for $\eta=2(\frac{1}{2}A)^2\cdot R'(d)\cdot R(0)$, $\tau\ll 1$ and $\Delta\tau\ll 1$

8—Estimation of the Phase Differential for Calibration:

$\Delta\phi_{cal}$ is realigned based on the estimations of the calibration error ($\Delta\phi=\Delta\phi_{cal}-\Delta\phi_{cal\,0}$) made on each satellite received. This makes it possible to average the measurement noises between the satellites, by weighting the measurements according to their quality, which depends on the signal-to-noise ratio and the inclination of the satellite: (see FIG. 5).

$\Delta\phi_{cal}(k)=\Delta\phi_{cal}(k-1)-\Sigma_{i=1\,to\,N}w_i(k)\cdot\epsilon_{\Delta\phi i}(k)$ $w_i(k)$=realignment gain dependent on the satellite in the channel i concerned (there are N channels)

For example: $w_i=C/N0_i/(\Sigma_{m=1\,to\,N}C/N0_m)\cdot e^{-dT/\tau}$ with $C/N0_i$ being the estimated signal-to-noise ratio on the channel i First Order Filter:

$\Sigma_{i=1\,to\,N}w_i(k)=e^{-dT/\tau}$ with $\tau$ being the time constant of the calibration filter and dT being the period in k $\epsilon_{\Delta\phi i}$ is an estimate of the phase differential calibration error:

$\epsilon_{\Delta\phi i}(k)=\Delta\phi_{ideal\,cal}-\Delta\phi_{cal}(k-1)+noise_{channel\,i}$

9—Delay Differential Estimation for Calibration:
As (see FIG. 5)

$\Delta\tau_{cal}(k)=\Delta\tau_{cal}(k-1)-\Sigma_{i=1\,to\,N}w_i(k)\cdot\epsilon_{\Delta\tau i}(k)$ $w_i$=realignment gain dependent on the satellite concerned.

Figure 9:
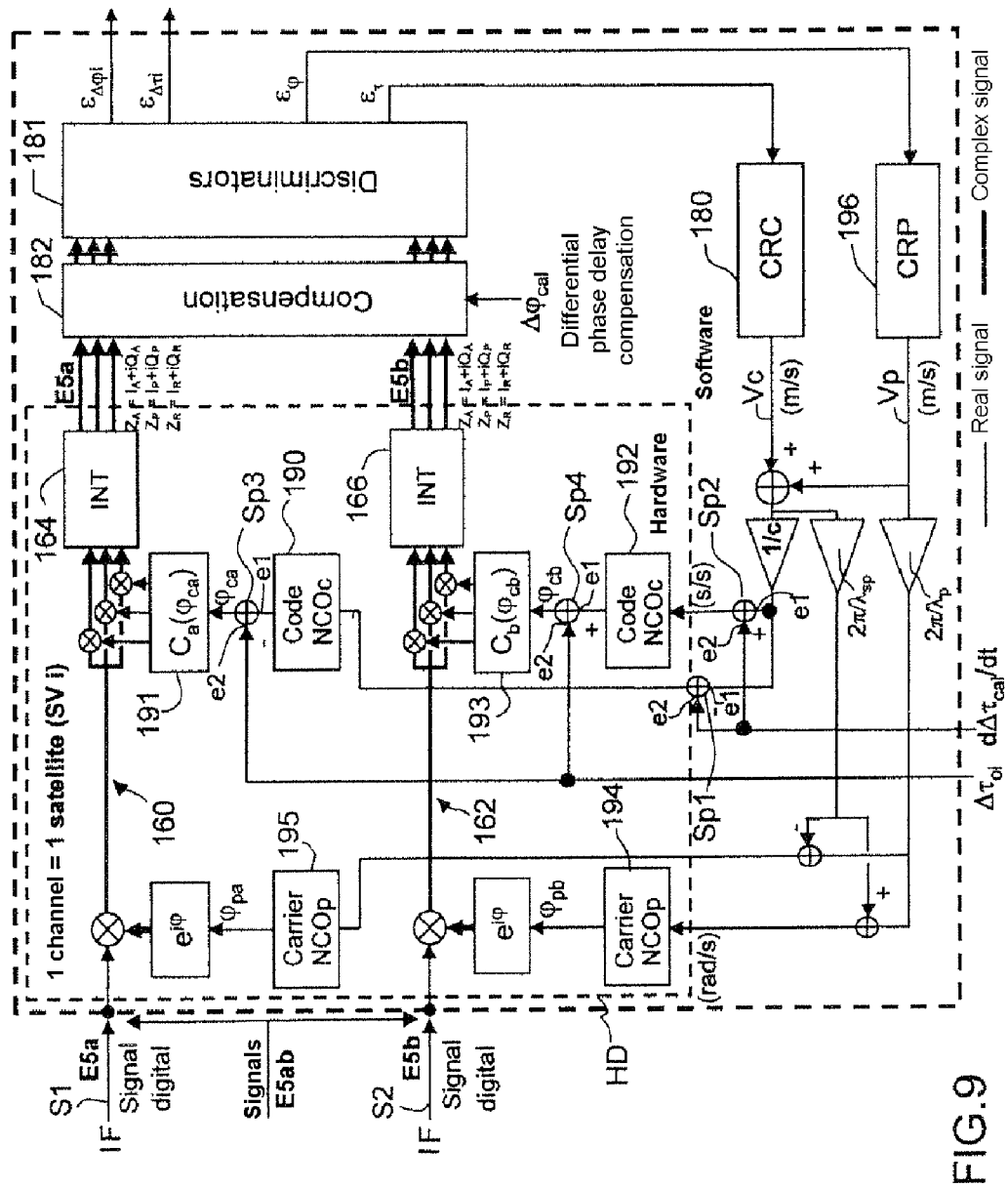
FIG. 9 represents a practical embodiment of a receive channel of the receiver according to the invention.

10—Practical Embodiment:

FIG. 9 represents a practical embodiment of a receive channel of the receiver according to the invention.

The idea is to retain the hardware architecture of a receive channel, which includes:
- the code NCOc and carrier NCOp numerically controlled oscillators,
- the local code and local carrier generators and the correlators (multipliers+integrator), identical to that of a separate processing between the two input signals (E5a and E5b) according to the state of the art. The only modification is to the processing carried out at low speed by software to obtain a receiver according to the invention. To this end, the compensation for the phase differential is applied at the correlator output, before the discriminators.

The receive channel of FIG. 9 comprises a hardware part HD defined by a broken line in FIG. 9, comprising the two correlation circuits 160, 162 for the two signals S1 and S2, in this example the signals E5a and E5b. Each of the correlation circuits 160, 162 includes an integrator INT 164, 166, each supplying signals:

for the carrier E5a correlator 160:

$Z_{Aa}=I_{Aa}+iQ_{Aa}$ $Z_{Pa}=I_{Pa}+iQ_{Pa}$ $Z_{Ra}=I_{Ra}+iQ_{Ra}$ for the carrier E5b correlator 162:

$Z_{Ab}=I_{Ab}+iQ_{Ab}$ $Z_{Pb}=I_{Pb}+iQ_{Pb}$ $Z_{Rb}=I_{Rb}+iQ_{Rb}$

Corresponding to the advance A, spot P and delay R code.

A compensation for the phase differential at the output of the correlators of the two circuits is applied before the discriminators 181 by a compensation module 182. The discriminators supply a code error signal $\epsilon_\tau$ and a carrier phase error signal $\epsilon_\phi$ for loop control, and a phase differential calibration error signal $\epsilon_{\Delta\phi}$ and a delay differential calibration error signal $\epsilon_{\Delta\tau}$ for the multi-channel calibration filter.

The compensation for the delay differential is applied at the input of the code NCOcs of the correlation circuits 160, 162, by deriving the correction $\Delta\tau_{cal}$ relative to the time, or $d\Delta\tau_{cal}/dt$, such that, at the output of the code oscillators NCOc, the desired correction is obtained.

To this end, the receive channel of FIG. 9 comprises:
- a summer Sp1 receiving via an input e1 a code velocity signal after the code loop corrector CRC 180 and, via an input e2 the derived correction signal $-d\Delta\tau_{cal}/dt$, and supplying to an output the aggregate signal of the signals applied to its two inputs e1 and e2 to supply the control for the code oscillator NCOc 190 of the correlation circuit receiving the carrier E5a and,
- a summer Sp2 receiving via an input e1 the code velocity signal after the code loop corrector CRC 180 and, via an input e2 the derived correction signal $d\Delta\tau_{cal}/dt$, and supplying to an output the aggregate signal of the signals applied to its two inputs to supply the control for the code oscillator NCOc 192 of the other correlation circuit receiving the carrier E5b.

Furthermore, there is added to the outputs of the two code oscillators NCOc 190, 192, driving the respective code generators 191, 193, a correction $\pm\Delta\tau_{0i}$ specific to the channel i which depends on the initial state of the NCOcs at the time when tracking in coherent mode is started.

To this end, the receive channel also includes:
a summer Sp3 receiving via an input e1 the signal output from the code oscillator NCOc 190 and, via an input e2 a correction $-\Delta\tau_{0i}$ specific to each channel and supplying to an output, the aggregate signal of the signals applied to its two inputs e1 and e2 to supply the phase of the code generators (191) of the correlation circuit receiving the carrier E5a and;
a summer Sp4 receiving via an input e1 the signal output from the code oscillator NCOc 192 and, via an input e2 a correction $+\Delta\tau_{0i}$ specific to each channel i and supplying to an output the aggregate signal of the signals applied to its two inputs e1 and e2 to supply the phase of the code generators (193) of the other correlation circuit receiving the carrier E5b.

The receive channel further comprises, for each correlation circuit, a central carrier oscillator NCOp 194, 195 driven on the basis of the central carrier velocity signal Vp supplied by a carrier loop corrector CRP 196 fed by the outputs of the discriminators 181.

The difference in embodiment between the carrier phase loop (compensation after correlation) and the code loop (compensation before correlation on the phases of the local codes) lies in the fact that a correction of $\theta$ on the phase of the local carrier is equivalent to a multiplication by $e^{j\theta}$ of the complex local carrier or a multiplication by $e^{-j\theta}$ of the output of the complex correlators. This cannot be applied generally to the code because a modification of the phase of the local code is reflected in a variation in amplitude (following a non-linear law dependent on the delay) on the correlators (and not a complex rotation).

For each satellite, the average of the measurements is taken:

$$\phi_{p\ i}=(\phi_{pa}+\phi_{pb})/2$$

$$t_{estimated\ received\ i}=(\phi_{ca}+\phi_{cb})/2$$

Figure 1:
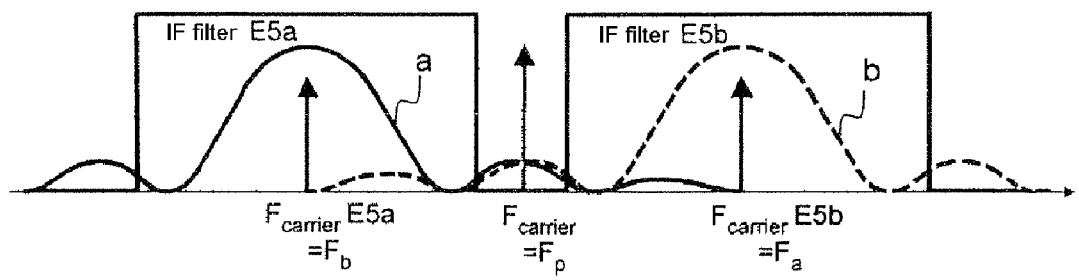
FIG. 1, already described, represents the spectra of a pair of signals transmitted by a satellite.
Figure 2:
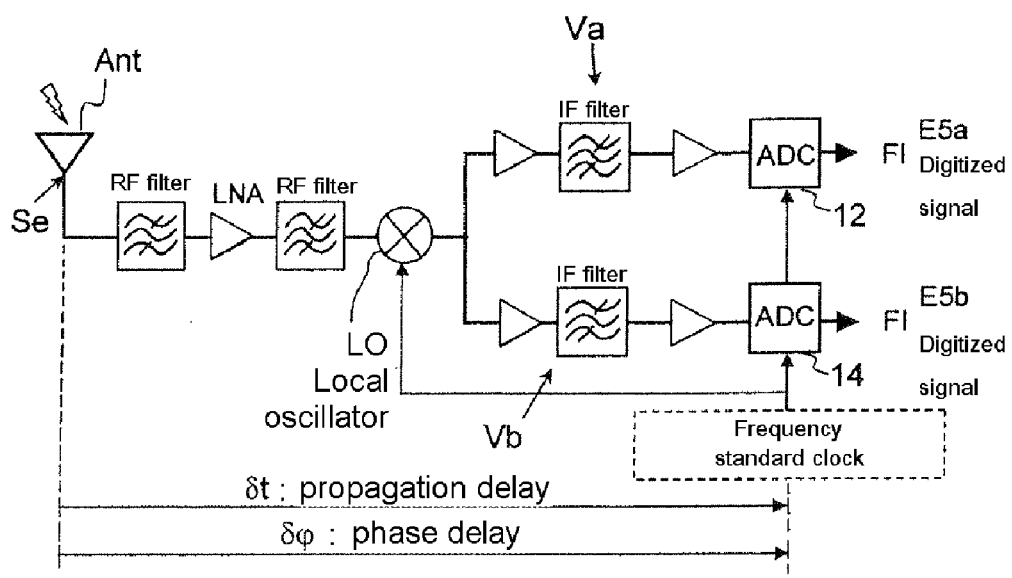
FIG. 2, already described, shows the input analogue stages of a satellite positioning receiver.

10.a—Initialization of Coherent Tracking:

The first step is to acquire and track each of the two signals independently as in the receiver represented in FIG. 2, according to the prior art.

Once each of the closed loop controls (PLL and DLL) has converged on each satellite, there is a switch to coherent tracking mode according to the receiver represented in FIG. 4 with calibration, by reorganizing the calculation of the velocity controls applied to the NCO, according to the receiver diagram of FIG. 9.

There is no change to the values of the phases output from the carrier NCOs, but they are corrected at the output of the correlators. However, it is necessary to correct the phases at the output of the code oscillators NCOc to conform to the diagram of FIG. 4 in which there is only one code NCOc. For this, a correction is applied to each of the code NCOs, of opposite sign, the purpose of which is to eliminate the code differences and initialize the calibration correction (then driven by variation velocity mode $d\Delta\tau_{cal}/dt$).

10.b—Initialization of Calibration (for all of the Satellites):

After the convergence phase for the separate tracking loops, there are observed delay $\Delta\tau_{cal}(0)$ and phase $\Delta\phi_{cal}(0)$ differentials between the two analogue paths E5a and E5b directly on the phases of the carriers and local codes, averaged over all the satellites:

$$\Delta\phi_{cal}(0)=\Sigma_{i=1\ to\ N}w_i(0)\cdot[(\phi_{pb\ 0\ i}-\phi_{pa\ 0\ i})/2-\omega_{sp}\cdot(\phi_{cb\ 0\ i}+\phi_{ca\ 0\ i})/2]$$

$$\Delta\tau_{cal}(0)=\Sigma_{i=1\ to\ N}w_i(0)\cdot[(\phi_{cb\ 0\ i}-\phi_{pa\ 0\ i})/2]$$

Where: $\Sigma_{i=1\ to\ N}w_i(k)=1$ (There is a similarity with the phase and delay differential calibration discriminators)

The calibration filter 140 is then maintained to follow the phase $\Delta\phi_{cal}$ and delay $\Delta\tau_{cal}$ differentials between the paths E5a and E5b, which can drift over time or change with temperature variations.

10.c—Compensation of the Phase Differential: (at the Correlator Output, by Software)

Let i=channel index

The outputs of the correlators are corrected by a rotation dependent on the phase difference observed on the channel (at the end of the separate tracking phase on E5a and E5b) and on the calibration correction $\Delta\phi_{cal}$ derived from all the channels.

$$Z_{A\ a\ i\ compensated}=A_i\cdot e^{+j\Delta\phi cal(0)}\cdot Z_{A\ a\ i}$$

$$Z_{A\ b\ i\ compensated}=B_i\cdot e^{-j\Delta\phi cal(0)}\cdot Z_{A\ b\ i}$$

$$Z_{P\ a\ i\ compensated}=A_i\cdot e^{+j\Delta\phi cal(0)}\cdot Z_{P\ a\ i}$$

$$Z_{P\ b\ i\ compensated}=B_i\cdot e^{-j\Delta\phi cal(0)}\cdot Z_{P\ b\ i}$$

$$Z_{R\ a\ i\ compensated}=A_i\cdot e^{+j\Delta\phi cal(0)}\cdot Z_{R\ a\ i}$$

$$Z_{R\ b\ i\ compensated}=B_i\cdot e^{-j\Delta\phi cal(0)}\cdot Z_{R\ b\ i}$$

$$A_i=\exp i(-[(\phi_{pb\ 0\ i}-\phi_{pa\ 0\ i})/2-\omega_{sp}\cdot(\phi_{cb\ 0\ i}+\phi_{ca\ 0\ i})/2])$$

$$B_i=\exp i(+[(\phi_{pb\ 0\ i}-\phi_{pa\ 0\ i})/2-\omega_{sp}\cdot(\phi_{cb\ 0\ i}+\phi_{ca\ 0\ i})/2])$$

Thus, just after the correction:

$$Z_{P\ a\ i\ compensated}=A_i\cdot e^{+j\Delta\phi cal}(0)\cdot\tfrac{1}{2}A\cdot\exp i(-\phi_{pa\ 0\ i}+\phi_{a\ received\ i}+\delta\phi_a)\cdot R(\ldots)$$

$$Z_{P\ b\ i\ compensated}=B_i\cdot e^{-j\Delta\phi cal}(0)\cdot\tfrac{1}{2}A\cdot\exp i(-\phi_{pb\ 0\ i}+\phi_{b\ received\ i}+\delta\phi_b)\cdot R(\ldots)$$

$$Z_{P\ a\ i\ compensated}=\tfrac{1}{2}A\cdot\exp i[(\phi_{pb\ 0\ i}+\phi_{pa\ 0\ i})/2+\omega_{sp}\cdot(\phi_{cb\ 0\ i}+\phi_{ca\ 0\ i})/2+j\Delta\phi_{cal}(0)+\phi_{a\ received\ i}+\delta\phi_a]\cdot R(\ldots)$$

$$Z_{P\ b\ i\ compensated}=\tfrac{1}{2}A\cdot\exp i[(\phi_{pb\ 0\ i}+\phi_{pa\ 0\ i})/2-\omega_{sp}\cdot(\phi_{cb\ 0\ i}+\phi_{ca\ 0\ i})/2-j\Delta\phi_{cal}(0)+\phi_{b\ received\ i}+\delta\phi_b]\cdot R(\ldots)$$

Which is equivalent to:

$$Z_{P\ a\ i\ compensated}=\tfrac{1}{2}A\cdot\exp i[-\phi_{pa\ virtual\ i}+\phi_{a\ received\ i}+\delta\phi_a]\cdot R(\ldots)$$

$$Z_{P\ b\ i\ compensated}=\tfrac{1}{2}A\cdot\exp i[-\phi_{pb\ virtual\ i}+\phi_{b\ received\ i}+\delta\phi_b]\cdot R(\ldots)$$

With:

$$\phi_{pa\ virtual\ i}=\phi_{p\ 0\ i}+\omega_{sp}\cdot\phi_{c\ 0\ i}+\Delta\phi_{cal}(0)$$

$$\phi_{pb\ virtual\ i}=\phi_{p\ 0\ i}-\omega_{sp}\cdot\phi_{c\ 0\ i}-\Delta\phi_{cal}(0)$$

$$\phi_{p\ 0\ i}=(\phi_{pb\ 0\ i}+\phi_{pa\ 0\ i})/2$$

$$\phi_{c\ 0\ i}=(\phi_{cb\ 0\ i}+\phi_{ca\ 0\ i})/2$$

$\phi_{p\ 0\ i}$ and $\phi_{sp\ 0\ i}$ depend on the channel (and therefore the satellite) whereas $\Delta\phi_{cal}(0)$ is common to all the channels Conclusion: An expression according to the diagram of FIG. 4 applies.

10.4—Compensation of the Delay Differential: (at the Code NCOc Output)

Initialization:

Initial correction: $\Delta\tau_{0\,i} = -(\phi_{cb\,0\,i} - \phi_{ca\,0\,i})/2 + \Delta\tau_{cal}(0)$ This correction, specific to each channel, is applied at the output of the code NCOs, according to the diagram of FIG. 4 (it could also be induced by adjusting the NCO controls, by slip, on initialization) on initialization.

Thus, just after the correction:

$\phi_{ca\,i} = \phi_{ca\,0\,i} - \Delta\tau_{0\,i} = (\phi_{cb\,0\,i} + \phi_{ca\,0\,i})/2 - \Delta\tau_{cal}(0)$ $\phi_{cb\,i} = \phi_{cb\,0\,i} + \Delta\tau_{0\,i} = (\phi_{cb\,0\,i} + \phi_{ca\,0\,i})/2 + \Delta\tau_{cal}(0)$ Which is equivalent to:

$\phi_{ca\,i} = \phi_{c\,0\,i} - \Delta\tau_{cal}(0)$ $\phi_{cb\,i} = \phi_{c\,0\,i} + \Delta\tau_{cal}(0)$ $\phi_{c\,0\,i}$ depends on the channel (and therefore the satellite) whereas $\Delta\tau_{cal}(0)$ is common to all the channels Conclusion: An expression according to the diagram of FIG. 3 applies.

Note:

In the ideal case where, for each channel, the following applies:

$(\phi_{pb\,i} - \phi_{pa\,i})/2 - \omega_{sp} \cdot (\phi_{cb\,i} + \phi_{ca\,i})/2 = \Delta\phi_{cal}(0)$ $\phi_{cb\,i} - \phi_{ca\,i})/2 = \Delta\tau_{cal}(0)$ (in other words, all the terms on the left would be identical, on all the channels)

The following would be obtained:

$A_i \cdot e^{-j\Delta\phi cal}(\mathbf{0}) = 1$ $B_i \cdot e^{+j\Delta\phi cal}(\mathbf{0}) = 1$ $\Delta\tau_{0\,i} = 0$ Therefore, the initial calibration would add nothing!

This result is not in fact surprising in as much as, at the end of the initial convergence phase, in this case, the objective of the calibration would already have been achieved: each channel is set to the maximum energy by the initial tracking loops on E5a and on E5b, and the values $\Delta\tau_{cal}(0)_i$ and $\Delta\phi_{cal}(0)_i$ of the delay differential and of the phase differential (respectively) observed at the output of the NCOs are identical on all the channels.

Maintaining the Compensation:

After initialization, the correction is maintained by adding a complement to the velocity mode controls of the two code NCOs, according to the diagram of FIG. 5:

$d\Delta\tau_{cal}/dt = [\Delta\tau_{cal}(k+1) - \Delta\tau_{cal}(k)]/dT$ with dT: sampling interval in k 10.5—Calibration of the Amplitude:

The gains of the two analogue paths can be different. It is important to compensate these differences when the discriminators are constructed, to avoid the biases due to the imbalance between the paths. For this, the ratio between the powers at the output of the spot correlators of the paths a and b is identified:

$\lambda(0) = \Sigma_{i=1\,to\,N} w_i(0)(\|Z_{P\,b}\|^2/\|Z_{P\,a}\|^2)_i$ $\lambda(k) = \lambda(k-1) - \Sigma_{i=1\,to\,N} w_i(k) \cdot [(\|Z_{P\,b}\|^2/\|Z_{P\,a}\|^2)_i - \lambda(k-1)]$ The compensation is applied to the output of the correlators, before the discriminators:

$Z_P = \lambda \cdot Z_{P\,a} + Z_{P\,b}$ $Z_A = \lambda \cdot e^{+i\omega d} Z_{A\,a} + e^{-i\omega d} Z_{A\,b}$ $Z_R = \lambda \cdot e^{-i\omega d} Z_{R\,a} + e^{+i\omega d} Z_{R\,b}$ It is assumed that the loop and calibration errors are taken up. In return, the compensation of the amplitude difference reduces the impact of the amplitude imbalance on the loop and calibration discriminators.

10.6—Data Processing

Case where the Signal has No Pilot Path (without Data):

In this case, the data bits must be rectified before applying the discriminators:

$Z_{A\,a\,rectified} = Z_{A\,a} \cdot \text{sign}(Im[Z_{P\,a}]) Z_{A\,b\,rectified} = Z_{A\,b} \cdot \text{sign}(Im[Z_{P\,b}])$ $Z_{P\,a\,rectified} = Z_{P\,a} \cdot \text{sign}(Im[Z_{P\,a}]) Z_{P\,b\,rectified} = Z_{P\,b} \cdot \text{sign}(Im[Z_{P\,b}])$ $Z_{R\,a\,rectified} = Z_{R\,a} \cdot \text{sign}(Im[Z_{P\,a}]) Z_{R\,b\,rectified} = Z_{R\,b} \cdot \text{sign}(Im[Z_{P\,b}])$ (Im: Real Part)

Case where there is a Desire to Use the Pilot and Data Paths:

The discriminators are applied to the pilot path only, except the code discriminator which uses both paths:

$\epsilon = \{Re[(Z_{A\,pilot} - Z_{R\,pilot}) \cdot Z_{P\,pilot}^*] + Re[(Z_{A\,data} - Z_{R\,data}) \cdot Z_{P\,data}^*]\}/2/\mu$ This makes it possible to reduce the thermal noise on the code measurement, provided that the signal-to-noise ratio is broadly positive in the predetection band ($B_{predetection} = 1/T$).

The receiver according to the invention allows for a better positioning measurement accuracy through a reduced sensitivity of the code measurement with respect to the thermal noise and the multiple-paths. It also offers better robustness (fewer cycle slips and losses of synchronization of the carrier phase loop due to interference).

This technique for correcting differential phase and delay occurring in the analogue receive stages for two carriers also applies when the analogue filter is common to the signals a and b, because there can be phase differences and delays between the two components of the signal, due to the distortions of the analogue filter transfer functions.

The invention claimed is:

1. A satellite positioning receiver comprising:
   at least one receive channel, each receive channel configured to perform a combined processing of a first S1 and a second S2 radiofrequency signal transmitted by one and the same satellite and separated in frequency, the signals being received by analogue paths of the receiver and then digitized to be processed in digital receive paths, wherein each receive channel includes:
   a first correlation circuit and a second correlation circuit, each correlation circuit respectively receiving the first and the second digitized received signals, each correlation circuit having:
      a carrier correlation path providing a correlation between the respective received signal and a respective complex local carrier;

code correlation paths providing a correlation between the correlated received signal at outputs of the carrier correlation paths and respective local codes; and an integrator for each code correlation path;

carrier and code phase discriminators, the discriminators being common to both correlation circuits and configured to supply, from signals output from the integrators of the two correlation circuits, a subcarrier and code velocity signal (Vc) after a code loop corrector, and a central carrier velocity signal after a carrier loop corrector;

a complex local carrier generator for each carrier correlation path, each local carrier generator being driven by a carrier local phase signal output from at least one carrier numerically controlled oscillator NCOp controlled by a central carrier velocity signal, a local code generator configured to generate local codes for each code correlation path, each code generator configured to be driven by a local code phase signal output from at least one code numerically controlled oscillator NCOc controlled by the subcarrier velocity (or code velocity) signal, the local codes supplied by each code generator being offset by a positive differential delay correction $+\Delta\tau_{cal}$ for one of the correlation circuits and a negative differential delay correction $-\Delta\tau_{cal}$ for the other, these corrections tending to compensate the delay differential between the two signals received in the analogue paths of the receive channel.

2. The satellite positioning receiver according to claim 1, wherein it comprises, in addition, a phase differential correction device $\Delta\phi_{cal}$ tending to compensate the phase differential deviation between the two received signals S1, S2 occurring in the analogue paths of the receive channel.

3. The satellite positioning receiver according to claim 1, wherein each receive channel further comprises:

a subcarrier correlation path for each received signal S1, S2 with complex local subcarriers generated by a respective subcarrier generator driven by a subcarrier local phase signal output from a code numerically controlled oscillator NCOc, each subcarrier correlation path configured to receive the correlated signals from its respective carrier correlation path and to supply subcarrier correlation signals to its respective code correlation path, the subcarrier local phase signal being offset by the phase differential $\Delta\phi_{cal}$ tending to compensate the phase differential between the two received signals being generated in the analogue paths of the receive channel.

4. The satellite positioning receiver according to claim 1, wherein it further comprises a calibration device configured to supply, based on phase and delay differential values estimated by the different channels of the receiver, the phase differential $\Delta\phi_{cal}$ and delay differential $\Delta\tau_{cal}$ correction values to be applied to the output of the carrier (or subcarrier) and code numerically controlled oscillators NCO common to all the channels.

5. The satellite positioning receiver according to claim 1, wherein each channel comprises the first correlation circuit driven by a first received signal S1 and the second correlation circuit driven by the second received signal S2, each correlation circuit comprising a central carrier correlation path between its respective received signal S1, S2 and two respective complex local carriers Lp1 for the first correlation path and Lp2 for the second path, these local carriers being generated by a respective local carrier generator driven by a local phase signal $\phi_p$ output from a common central carrier numerically controlled oscillator NCOp controlled by the carrier velocity signal Vp output from a central carrier phase discriminator circuit DSP through a central carrier phase corrector CRP, the signals output from the central carrier correlation paths being applied to subcarrier correlation paths with respective local subcarriers Ls1 for the first subcarrier correlation path and Ls2 for the other correlation path, then to the code correlation paths.

6. The satellite positioning receiver according to claim 5, wherein the local subcarriers Ls1 and Ls2 are configured to be generated by a respective local subcarrier generator driven by a subcarrier local phase signal $\phi_{sp}$ output from a common local subcarrier and code numerically controlled oscillator NCOc controlled by a code velocity signal Vc output from a code phase discriminator DSC of the discriminator circuit through a code phase corrector CRC and a subcarrier phase summer receiving, at an input ep1, the subcarrier phase output from the code oscillator NCOc and, at another input ep2, a phase differential correction $\Delta\phi_{cal}$ tending to compensate the phase differential between the two received signals occurring in the analogue paths of the receiver, the subcarrier phase summer supplying, at its output, a local phase signal of the phase-offset subcarriers to drive the subcarrier generator of the subcarrier correlation paths.

7. The satellite positioning receiver according to claim 6, wherein the signals output from the subcarrier correlation paths are then configured to be correlated in the respective code correlation paths with the respective local codes supplied by the respective local code generators for the signal S1 path and the signal S2 path, the local code generators being driven by a respective code phase signal $\phi_{CA}$, $\phi_{CB}$ output from the common code oscillator NCOc controlled by the subcarrier (or code) velocity signal Vc, through a first local code summer receiving at an input ec1 the phase of the local code output from the local code oscillator and at another input ec2 a differential delay correction $-\Delta\tau_{cal}$ tending to compensate the differential delay, the first summer supplying at an output an offset local code phase to drive the local code generator of the signal S1 path and a second local code summer receiving at an input ec1 the phase of the local code output from the local code oscillator NCOc and at another input ec2 a differential delay correction $+\Delta\tau_{cal}$ tending to compensate the differential delay, the second local code summer supplying at an output an offset local code phase to drive the local code generator of the signal S2 path.

8. The satellite positioning receiver according to claim 1, wherein each receive channel comprises a code NCOc for each component of the signal S1 and S2 and respective differential delay corrections, positive $+\Delta\tau_{cal}$ and negative $-\Delta\tau_{cal}$, are performed by applying correction signals $+d\Delta\tau_{cal}/dt$ and $-d\Delta\tau_{cal}/dt$, derived from the differential delay signal $+\Delta\tau_{cal}$ and $-\Delta\tau_{cal}$ relative to the time t, to the inputs of the respective code NCOcs, and the output from the code numerically controlled oscillators NCOc include a respective correction $+\Delta\tau_{0i}$ and $-\Delta\tau_{0i}$ specific to each channel i that depends on the initial state of the code oscillators NCOc at the moment when the receive channel begins coherent mode tracking of the signal.

9. The satellite positioning receiver according to claim 5, wherein each of the correlation circuits of the receive channel comprises an integrator INT, each supplying signals:

for the carrier E5a correlator:

$$Z_{Aa} = I_{Aa} + iQ_{Aa}$$

$$Z_{Pa} = I_{Pa} + iQ_{Pa}$$

$$Z_{Ra} = I_{Ra} + iQ_{Ra},$$

for the carrier E5b correlator:

$Z_{Ab} = I_{Ab} + iQ_{Ab}$ $Z_{Pb} = I_{Pb} + iQ_{Pb}$ $Z_{Rb} = I_{Rb} + iQ_{Rb}$ corresponding to the advance A, spot P and delay R codes.

10. The satellite positioning receiver according to claim 5, wherein a phase differential compensation output from the correlators of the two circuits is applied before the discriminators by a compensation module, the discriminators supplying a code error signal $\epsilon_\phi$ and a phase velocity error signal $\epsilon_\phi$ for locking the loops.

11. The satellite positioning receiver according to claim 5, wherein each receive channel comprises:
   a summer Sp1 receiving via an input e1 a code velocity signal after a CRC code velocity correction and, via an input e2 the derived correction signal $-d\Delta\tau_{cal}/dt$, and supplying at an output the aggregate signal of the signals applied to its two inputs e1 and e2 to drive the code numerically controlled oscillator NCOc of the correlation circuit receiving the carrier E5a and,
   a summer Sp2 receiving via an input e1 the code velocity signal $\epsilon_\tau$ after the CRC code velocity correction and, via an input e2, the derived correction signal $d\Delta\tau_{cal}/dt$, and supplying at an output, the aggregate signal of the signals applied to its two inputs to drive the code numerically controlled oscillator NCOc of the other correlation circuit receiving the carrier E5b;
   a summer Sp3 receiving via an input e1 the signal output from the code oscillator NCOc and, via an input e2 a correction $-\Delta\tau_{0i}$ specific to each channel and supplying at an output the aggregate signal of the signals applied to its two inputs e1 and e2 to supply the phase of the code generators of the correlation circuit receiving the carrier E5a and;
   a summer Sp4 receiving via an input e1 the signal output from the code oscillator NCOc and, via an input e2, a correction $+\Delta\tau_{0i}$ specific to the channel i and supplying at an output the aggregate signal of the signals applied to its two inputs e1 and e2 to supply the phase of the code generators of the other correlation circuit receiving the carrier E5b;
   for each correlation circuit, a central carrier oscillator NCOp driven from the central carrier velocity signal Vp supplied by a CRP carrier loop corrector fed by the outputs of the discriminators.

12. The satellite positioning receiver according to claim 1, wherein the code discriminator uses the output of the advance, spot and delay correlation paths on S1 and S2 (after calibration).

13. The satellite positioning receiver according to claim 2, wherein each receive channel comprises a code NCOc for each component of the signal S1 and S2 and in that the respective differential delay corrections, positive $+\Delta\tau_{cal}$ and negative $-\Delta\tau_{cal}$, are performed by applying to the inputs of the respective code NCOcs correction signals $+d\Delta\tau_{cal}/dt$ and $-d\Delta\tau_{cal}/dt$ derived from the differential signal $+\Delta\tau_{cal}$ and $\Delta\tau_{cal}$ relative to the time t, and in that there is added to the output from the code numerically controlled oscillators NCOc a respective correction $+\Delta\tau_{0i}$ and $-\Delta\tau_{0i}$ specific to each channel i which depends on the initial state of the code oscillators NCOc at the moment when the receive channel begins coherent mode tracking of the signal.

\* \* \* \* \*